(12) United States Patent
Moshfeghi

(10) Patent No.: US 8,818,418 B2
(45) Date of Patent: *Aug. 26, 2014

(54) METHOD AND SYSTEM FOR DEVICE POSITIONING UTILIZING DISTRIBUTED TRANSCEIVERS WITH ARRAY PROCESSING

(71) Applicant: Golba LLC, Rancho Palos Verdes, CA (US)

(72) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/056,864

(22) Filed: Oct. 17, 2013

(65) Prior Publication Data

US 2014/0045527 A1 Feb. 13, 2014

Related U.S. Application Data

(60) Division of application No. 13/435,151, filed on Mar. 30, 2012, now Pat. No. 8,639,270, which is a continuation-in-part of application No. 12/852,443, filed on Aug. 6, 2010, now Pat. No. 8,314,736.

(51) Int. Cl.
*H04W 24/00* (2009.01)
(52) U.S. Cl.
USPC .................. 455/456.5; 455/435.2; 455/452.1; 455/553.1; 370/330; 370/334; 370/541
(58) Field of Classification Search
None
See application file for complete search history.

(56) References Cited

U.S. PATENT DOCUMENTS

| | | | |
|---|---|---|---|
| 6,693,592 B2 | 2/2004 | Dowdle et al. | |
| 2004/0198381 A1 | 10/2004 | Siegel et al. | |
| 2005/0281363 A1 | 12/2005 | Qi et al. | |
| 2007/0242647 A1 | 10/2007 | Bennett | |
| 2007/0258421 A1 | 11/2007 | Alizadeh-Shabdiz et al. | |
| 2008/0167049 A1 | 7/2008 | Karr et al. | |
| 2008/0284646 A1* | 11/2008 | Walley et al. | 342/357.09 |
| 2009/0042614 A1 | 2/2009 | Karaoguz et al. | |
| 2010/0173663 A1 | 7/2010 | Umeda | |

(Continued)

OTHER PUBLICATIONS

U.S. Appl. No. 14/056,858, filed Oct. 17, 2013, Moshfeghi, Mehran.

(Continued)

*Primary Examiner* — Vladimir Magloire
*Assistant Examiner* — Keith Fang
(74) *Attorney, Agent, or Firm* — Adeli LLP

(57) ABSTRACT

A mobile device receives RF signals from base stations in a location scanning region. Each of the base stations includes a plurality of distributed transceivers and each distributed transceiver includes an independently configurable antenna array. The mobile device generates and communicates channel measurements for the received radio frequency signals to a remote location server (RLS). The RLS configures, utilizing one or more channel transmit settings, the independently configurable antenna array for the distributed transceivers in the location scanning region, to transmit the RF signals. The RLS determines a coarse position estimate for the mobile device for the sub-regions within the location scanning region and applies different signature functions to the determined coarse position estimate for the sub-regions to generate corresponding sub-regions position estimates. The RLS determines a position estimate for the mobile device based on the sub-regions position estimates and communicates the position estimate to the mobile device.

40 Claims, 8 Drawing Sheets

(56) References Cited

U.S. PATENT DOCUMENTS

| | | |
|---|---|---|
| 2010/0298015 A1 | 11/2010 | Medbo et al. |
| 2010/0309051 A1 | 12/2010 | Moshfeghi |
| 2010/0311456 A1 | 12/2010 | Inoue et al. |
| 2011/0043407 A1* | 2/2011 | Moshfeghi .................. 342/394 |
| 2013/0260798 A1 | 10/2013 | Moshfeghi |

OTHER PUBLICATIONS

U.S. Appl. No. 14/056,869, filed Oct. 17, 2013, Moshfeghi, Mehran.

Portions of prosecution history of U.S. Appl. No. 13/435,151, Sep. 19, 2013, Moshfeghi, Mehran.

* cited by examiner

METHOD AND SYSTEM FOR DEVICE POSITIONING UTILIZING DISTRIBUTED TRANSCEIVERS WITH ARRAY PROCESSING

CROSS-REFERENCE TO RELATED APPLICATIONS/INCORPORATION BY REFERENCE

This application is a divisional of application Ser. No. 13/435,151 filed Mar. 30, 2012, now issued as U.S. Pat. No. 8,639,270, which in turn is a continuation-in-part of application Ser. No. 12/852,443, filed on Aug. 6, 2010, now issued as U.S. Pat. No. 8,314,736.

This application also makes reference to:
U.S. application Ser. No. 12/852,443 filed on Aug. 6, 2010, now issued as U.S. Pat. No. 8,314,736; and U.S. Application Ser. No. 61/224,347 filed on Jul. 9, 2009.

Each of the above stated applications is hereby incorporated herein by reference in its entirety.

FIELD OF THE INVENTION

Certain embodiments of the invention relate to signal processing for communication systems. More specifically, certain embodiments of the invention relate to a method and system for device positioning utilizing distributed transceivers with array processing and database processing.

BACKGROUND OF THE INVENTION

Location based services (LBSs) are emerging as a value-added service provided by mobile communication network. LBSs are mobile services in which the user location information is used in order to enable various LBS applications such as, for example, enhanced 911 (E-911) services. A position of a mobile device is determined in different ways such as, for example, using network-based technology, using terminal-based technology, and/or using hybrid technology (a combination of the former technologies). Many positioning technologies such as, for example, Cell of Origin (COO), Time of Arrival (TOA), Observed Time Difference of Arrival (OT-DOA), Enhanced Observed Time Difference (E-OTD) as well as the satellite-based systems such as the global positioning system (GPS), or Assisted-GPS (A-GPS), are in place to estimate the location of the mobile device and convert it into a meaningful X, Y coordinate for LBS applications.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for device positioning utilizing distributed transceivers with array processing and database processing, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for device positioning utilizing distributed transceivers with array processing and database processing. In accordance with various exemplary embodiments of the invention, a mobile device in a multipath environment may be operable to receive direct line of sight and multipath radio frequency signals from one or more base stations each with multiple distributed transceivers. Each of the distributed transceivers may operate at different carrier frequencies. Each of the distributed transceivers may be equipped with an independently configurable antenna array handling transmissions or receptions of the radio frequency signals to/from the mobile device. In one embodiment, the distributed transceivers transmit a waveform and the mobile device performs the reception and propagation channel estimation. In another embodiment, the mobile device may transmit a waveform and each of the distributed transceivers may perform respective channel estimations. The mobile device may process the received signals to generate channel measurements for the received signals. A remote location server may be operable to locate the mobile device utilizing the channel measurements for the mobile device. In this regard, corresponding transmit diversity configurations may be determined by the location server. The corresponding transmit diversity configurations may be applied to the base stations for conducting the channel measurements for the mobile device, and channel measurements at each scanned location in a location scanning region. The location server may calculate the position estimate for the mobile device over the location scanning region utilizing the channel measurements for the mobile device, the channel measurements at scanned locations, and corresponding transmit diversity configurations. A signature function for the channel measurements over the corresponding transmit diversity configurations may be selected by the location server. The location server may utilize the signature function to calculate the position estimate for the mobile device over the transmit diversity configurations. Depending on resolution of the signature function over the scanned locations in the location scanning region, a multi-level positioning process may be performed for highly accurate positioning. In this regard, the location server may utilize a different signature function, a subset of transmit configurations and/or a subspace of the location scanning region to update the position estimate for the mobile device.

Figure 1:
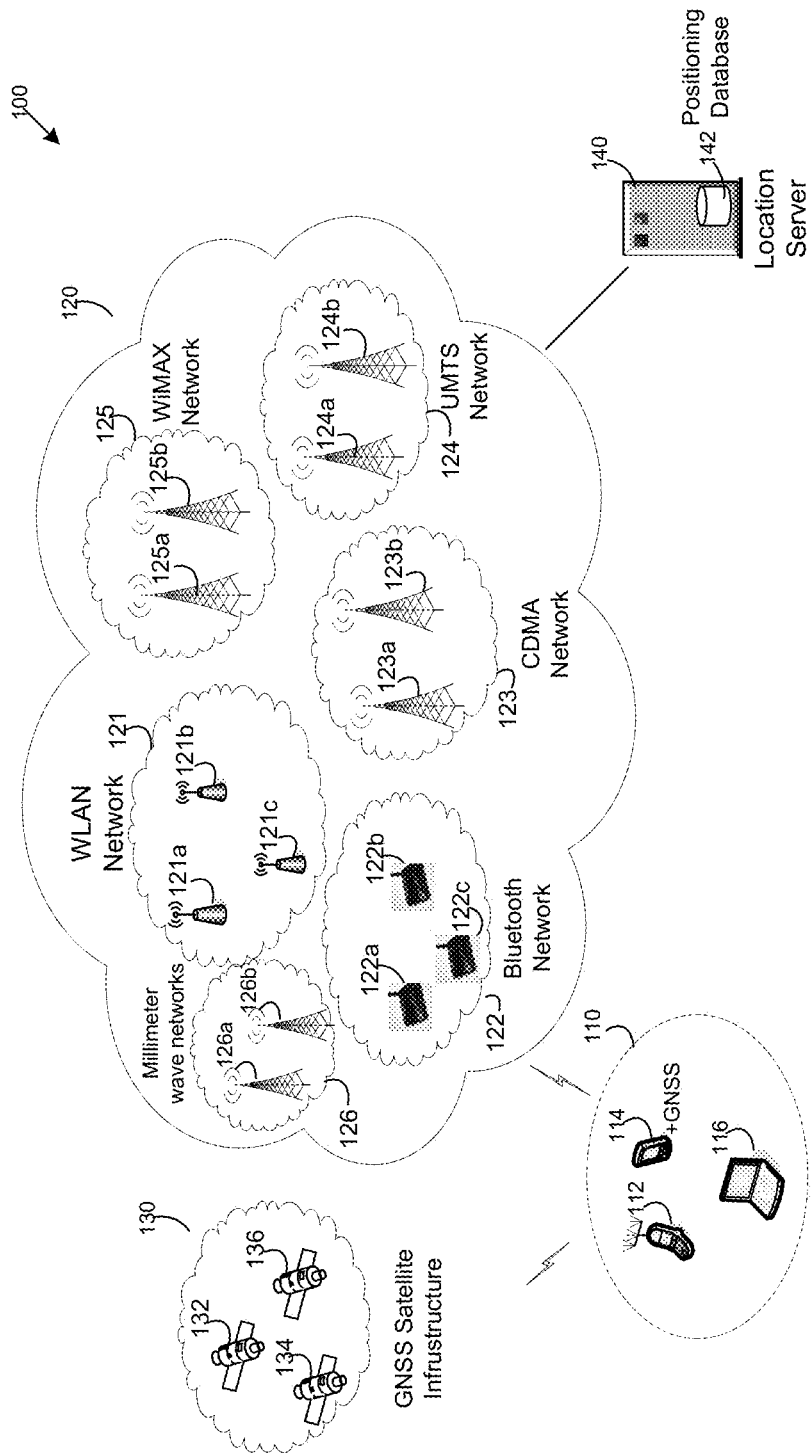
FIG. 1 is a diagram illustrating an exemplary communication system that supports device positioning utilizing distributed transceivers with array processing, in accordance with an embodiment of the invention.

FIG. 1 is a diagram illustrating an exemplary communication system that supports device positioning utilizing distributed transceivers with array processing, in accordance with an embodiment of the invention. Referring to FIG. 1, there is shown a communication system 100. The communication system 100 comprises a plurality of multi-radio mobile devices, of which multi-radio mobile devices 112-116 are illustrated, a heterogeneous network system 120, a Global Navigation Satellite Systems (GNSS) satellite infrastructure 130, and a location server 140 comprising a reference database 142. The heterogeneous network system 120 comprises a plurality of different radio access networks, of which a WLAN network 121, a Bluetooth network 122, a CDMA network 123, a UMTS network 124, a WiMAX network 125, and millimeter wave networks 126 are illustrated.

The multi-radio mobile devices 112-116 may comprise suitable logic, circuitry, interfaces and/or code that are operable to communicate radio frequency signals with a plurality of mobile communication networks such as, for example, the WLAN network 121, the Bluetooth network 122, the CDMA network 123, the UMTS network 124, the WiMAX network 125, and/or the mmWave networks 126. Depending on device capabilities and user preferences, a multi-radio mobile device such as the multi-radio mobile device 112 may utilize or enable one or more radios such as a WLAN radio and a cellular radio to communicate with radio sites in radio access networks to receive signals of a desired service. Radio sites, as used herein, of a specific radio access network may comprise one or more base stations or access points. Radios such as a millimeter Wave (mmWave), a WLAN, WiMax, Bluetooth, Bluetooth Low Energy (BLE), or other types of radios may be utilized to receive radio frequency signals for the desired service over radio channels. In this regard, radios such as mmWave radios may be utilized at very high carrier frequencies for high throughput wireless communications. For example, various standards organization such as, for example, the 60 GHz wireless standard, WirelessHD, WiGig, and WiFi IEEE 802.11ad, are using high frequencies such as the 60 GHz frequency spectrum for high throughput wireless communications. The 60 GHz spectrum band may also be used for unlicensed short-range data links such as 1.7 km with data throughputs up to 6 Gbits/s.

In mobile communication, a radio channel may be characterized by multipath reception, which refers to receiving not only direct line-of-sight (LOS) radio waves, but also a number of reflected radio waves, that is non-LOS radio waves. With multi-radio capability, the multi-radio mobile device 112 may be operable to receive signals from a set of radio sites such as the base stations 123a and the WLAN AP 121a. In an embodiment of the invention, the multi-radio mobile device 112 may be operable to perform both non-LOS measurements and LOS measurements over signals received from a selected radio site such as the base station 123a. Depending on device capabilities, the multi-radio mobile device 112 may be configured to derive or determine propagation channel responses or received signal strength indicators (RSSIs) utilizing the LOS measurements and the non-LOS measurements for the received signals.

In an embodiment of the invention, the multi-radio mobile device 112 may be operable to create or form channel measurements for corresponding signals received from selected radio sites such as the base station 123a. In this regard, the channel measurements for the signals received from the base station 123a may be either the propagation channel responses or RSSIs. In instances where the base station 123a is utilized to determine or estimate the position for the multi-radio mobile device 112, the corresponding channel measurements may be uploaded or communicated to the location server 140 via the heterogeneous network system 120. For example, the uploaded channel measurements may be combined over multiple transceivers of the base station 123a to create a channel signature with higher channel resolution characteristic. A so-called channel signature is referred to as a channel transfer function or simply a channel. U.S. application Ser. No. 12/852,443 filed on Aug. 6, 2010, now issued as U.S. Pat. No. 8,314,736; provides detailed descriptions relates to identifying or determining channel characteristics for received signals at a given location utilizing various means, each of which is hereby incorporated herein by reference in its entirety.

In other embodiments a mobile device such as the mobile device 116 may be operable to locate itself. For example, the mobile device 116 may receive its position from the location server 140 or computes its position itself. The mobile device 116 then may act as a moving base station and may generate channel estimations at its position for other mobile devices such as mobile device 112.

The heterogeneous network system 120 may comprise suitable devices, circuitry, interfaces and/or code that are operable to provide radio connections between a wireless mobile device such as the multi-radio mobile device 112 and appropriate wireless radio communication networks. Different radio access technologies may be utilized in the heterogeneous network system 120 to provide the multi-radio mobile device 112 with an access to a desired service.

The WLAN network 121 may comprise suitable devices, circuitry, interfaces and/or code that are operable to provide data services to wireless LAN enabled communication devices such as the multi-radio mobile device 112 using wireless LAN technology. Exemplary wireless LAN technology may comprise, for example, IEEE Standard 802.11, 802.11a, 802.11b, 802.11d, 802.11e, 802.11g, 802.11n, 802.11ac, 802.11v, and/or 802.11u. The WLAN network 121 comprises a plurality of WLAN access points such as WLAN access points (APs) 121a through 121c. The WLAN network 121 may be operable to communicate various data services such as a location-based service (LBS) over WLAN connections between the WLAN APs 121a through 121c and corresponding WLAN capable devices such as, for example, the multi-radio mobile device 112. In this regard, the WLAN APs 121a through 121c each may utilize multiple distributed transceivers to communicate with the multi-radio mobile device 112 over the WLAN connections. Transceivers of the WLAN AP 121a, for example, may be configured as distributed transceiver architecture. Each distributed transceiver for the WLAN APs 121a may be equipped with an antenna array. In this regard, each antenna array for the WLAN AP 121a may be independently configured at a different and sufficiently uncorrelated direction to create several independent antenna arrays for accurately positioning of the multi-radio mobile device 112.

The Bluetooth network 122 may comprise suitable devices, circuitry, interfaces and/or code that are operable to provide data services to various Bluetooth enabled mobile devices such as the multi-radio mobile device 112 using Bluetooth technology. Exemplary Bluetooth technology may comprise, for example, IEEE Standard IEEE 802.15 WPAN and/or IEEE 802.15.4. Other PAN technology such as Bluetooth Low Energy (BLE) and ZigBee may also be utilized without deviating from the spirit and scope of the invention. The Bluetooth network 122 comprises a plurality of Bluetooth access points such as Bluetooth access points 122a through 122c. The Bluetooth network 122 may be operable to communicate various data services such as a location-based service (LBS) over Bluetooth connections between, for example, the multi-radio mobile device 112 and a Bluetooth access point (AP) such as the Bluetooth AP 122a. In this regard, the Bluetooth APs 122a through 122c may each utilize multiple distributed transceivers to communicate with the multi-radio mobile device 112 over the Bluetooth connections. Transceivers of the Bluetooth AP 122a, for example, may be configured as distributed transceiver architecture. Each distributed transceiver for the Bluetooth APs 122a may be equipped with an antenna array. In this regard, each antenna array for the Bluetooth AP 122a may be independently configured at a different and sufficiently uncorrelated direction to create several independent antenna arrays for accurately positioning of the multi-radio mobile device 112.

The CDMA network 123 may comprise suitable devices, circuitry, interfaces and/or code that are operable to provide data services to various CDMA enabled mobile devices such as the multi-radio mobile device 112 using CDMA technology or variants thereof, for example, WCDMA. The CDMA network 123 comprises a plurality of base stations such as base stations 123a through 123b. The CDMA network 123 may be operable to communicate various data services such as a location-based service (LBS) over CDMA connections between, for example, the multi-radio mobile device 112 and a CDMA base station such as the base station 123a. In this regard, the base stations 123a through 123b each may utilize multiple distributed transceivers to communicate with the multi-radio mobile device 112 over the CDMA connections. Transceivers of the base station 123a, for example, may be configured as distributed transceiver architecture. Each distributed transceiver for the base station 123a may be equipped with an antenna array. In this regard, each antenna array for the base station 123a may be independently configured at a different and sufficiently uncorrelated direction to create several independent antenna arrays for accurately positioning of the multi-radio mobile device 112.

The UMTS network 124 may comprise suitable devices, circuitry, interfaces and/or code that are operable to provide data services to various UMTS enabled mobile devices such as the multi-radio mobile device 112 using UMTS technology. The UMTS network 124 comprises a plurality of base stations such as base stations 124a through 124b. The UMTS network 124 may be operable to communicate various data services such as a location-based service (LBS) over UMTS connections between, for example, the multi-radio mobile device 112 and a UMTS base station such as the base station 124a. In this regard, the base stations 124a through 124b each may utilize multiple distributed transceivers to communicate with the multi-radio mobile device 112 over the UMTS connections. Transceivers of the base station 124a, for example, may be configured as distributed transceiver architecture. Each distributed transceiver for the base station 124a may be equipped with an antenna array. In this regard, each antenna array for the base station 124a may be independently configured at a different and sufficiently uncorrelated direction to create several independent antenna arrays for accurately positioning of the multi-radio mobile device 112.

The WiMAX network 125 may comprise suitable devices, circuitry, interfaces and/or code that are operable to provide data services to various WiMAX enabled mobile devices such as the multi-radio mobile device 112 using WiMAX technology. The WiMAX network 125 comprises a plurality of WiMAX base stations such as base stations 125a through 125b. The WiMAX network 125 may be operable to communicate various data services such as a location-based service (LBS) over WiMAX connections between, for example, the multi-radio mobile device 112 and a WiMAX base station such as the base station 125a. In this regard, the base stations 125a through 125b may utilize each multiple distributed transceivers to communicate with the multi-radio mobile device 112 over the WiMAX connections. Transceivers of the base station 125a, for example, may be configured as distributed transceiver architecture. Each distributed transceiver for the base station 125a may be equipped with an antenna array. In this regard, each antenna array for the base station 125a may be independently configured at a different and sufficiently uncorrelated direction to create several independent antenna arrays for accurately positioning of the multi-radio mobile device 112.

The millimeter wave networks 126, which may operate at the 60 GHz carrier frequency, may be used due to their efficient beam forming characteristics by using configurable antenna arrays and smaller size of antennas, and antenna arrays for the 60 GHz frequency range. The mmWave networks 126 may be implemented utilize wireless technology as defined in WiGig or IEEE 802.11ad standards. The mmWave networks 126 may comprise devices capable of operating according to the 60 GHz standards WiGig or IEEE 802.11ad or a proprietary non-standard 60 GHz protocol designed and optimized for positioning applications. Furthermore, base stations 126a and 126b in the millimeter wave networks 126 may deploy multiple transceivers each with a configurable or fixed antenna pattern.

The GNSS satellites 132 through 136 may comprise suitable logic, circuitry and/or code that may be operable to generate and broadcast satellite navigational information in suitable radio-frequency (RF) signals to various GNSS capable communication devices such as the multi-radio mobile device 114. The broadcast satellite navigational information may be utilized to determine the position for the multi-radio mobile device 114. In an embodiment of the invention, the determined position for the multi-radio mobile device 114 together with channel measurements available at the multi-radio mobile device 114 may be uploaded or communicated to the location server 140 for higher positioning resolution.

The location server 140 may comprise suitable logic, circuitry, interfaces and/or code that may be operable to receive channel measurements from a plurality of users such as radio sites and/or mobile devices in the heterogeneous network system 120. The received channel measurements may comprise propagation channel responses or RSSIs, and/or locations where the channel measurements are actually captured or detected.

The location server 140 may be operable to collect and/or retrieve channel measurements to build the positioning database 142. For a base station that is selected and utilized to determine or estimate the position for the multi-radio mobile device 112, the location server 140 may combine the collected channel measurements over the transceivers of the selected base station, thereby creating a channel with higher resolution characteristic for the selected base station. The location server 140 may utilize channel signatures of selected base stations to estimate or determine the position for the multi-radio mobile device 112. The location server 140 may provide the determined position via the heterogeneous network system 120 to the multi-radio mobile device 112 to support LBSs.

Although location server 140 is illustrated in FIG. 1 for wirelessly locate a mobile device utilizing channel measurements for the mobile device, the invention may not be so limited. Accordingly, one or more base stations with sufficient data processing capacity may be operable to locate the mobile device utilizing the channel measurements for the mobile device without departing from the spirit and scope of various embodiments of the invention.

In an exemplary operation, a device such as the multi-radio mobile device 114 may be operable to receive radio frequency signals from base stations such as the base stations 123a and the WLAN AP 121a. Each selected base station may be configured to utilize multiple distributed transceivers for communication with the multi-radio mobile device 114. Each distributed transceiver for the selected base station may be equipped with an independently configurable antenna array that is operable to provide highly accurate device positioning. Channel measurements such as propagation channel responses or RSSIs may be determined utilizing the LOS measurements and the non-LOS measurements for the received signals from the selected radio site. The channel measurements may be uploaded or communicated to the location server 140 via the heterogeneous network system 120. In certain instances, a base station may be selected and utilized to determine the position for the multi-radio mobile device 114. In this regard, the location server 140 may be operable to combine the channel measurements over the transceivers of the selected base station to create a channel signature or transfer function with higher channel resolution characteristic. The channel signature of the selected base station may be utilized to estimate or determine the position for the multi-radio mobile device 114. The location server 140 may provide the position estimate to the multi-radio mobile device 114 to support LBSs.

Figure 2:
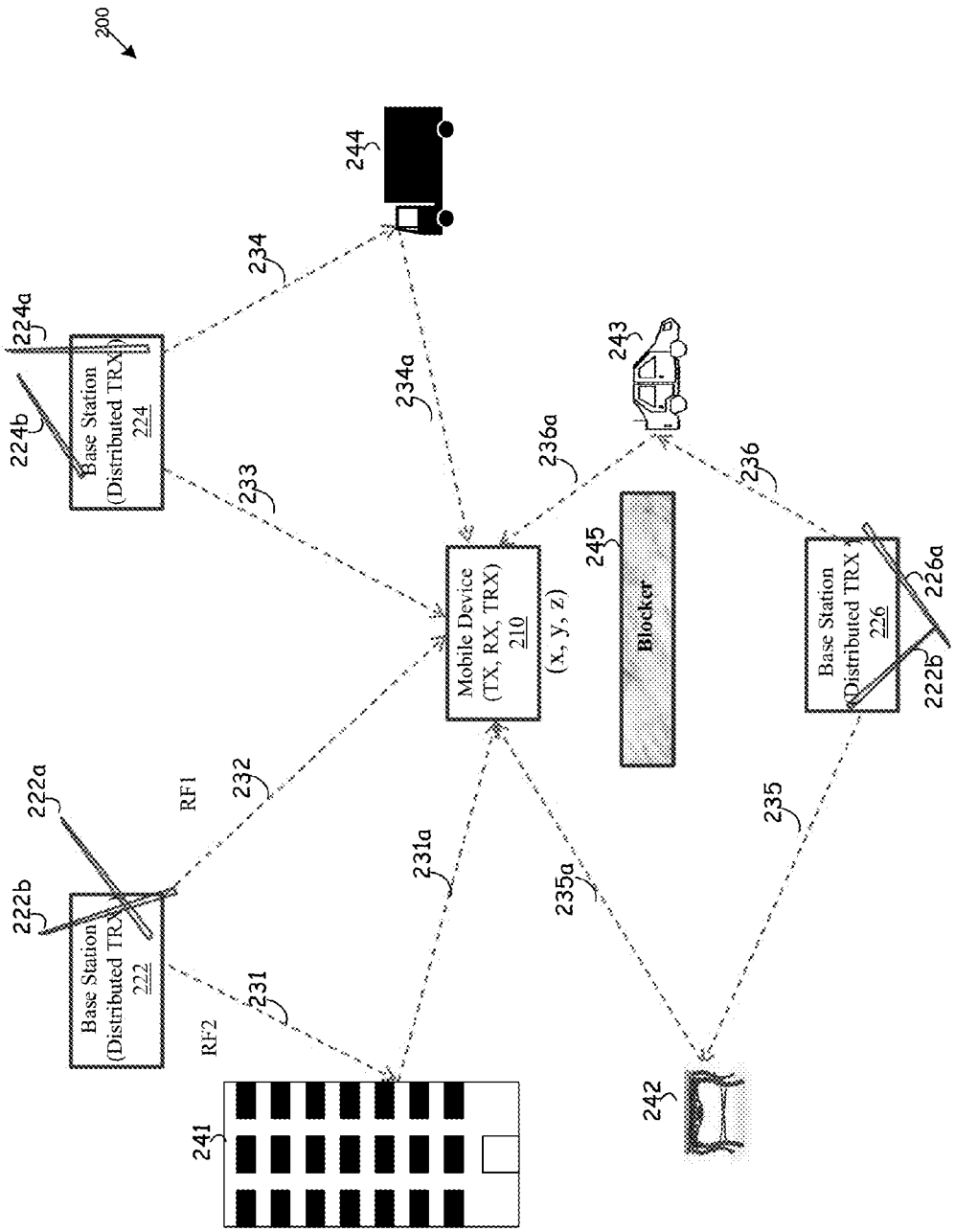
FIG. 2 shows a typical usage scenario where three radio sites each with multiple distributed transceivers are utilized to estimate the position of a mobile device, in accordance with an embodiment of the invention.

FIG. 2 shows a typical usage scenario where three radio sites each with multiple distributed transceivers are utilized to estimate the position of a mobile device, in accordance with an embodiment of the invention. As shown, three base stations 222, 224, and 226 each with multiple distributed transceivers may be utilized to estimate or determine the position of a mobile device 210. Each distributed transceiver for the base stations 222, 224, and 226 may be equipped with an independently configurable antenna array for highly accurate device positioning. For example, antenna arrays 222a and 222b, antenna arrays 224a and 224b, and antenna arrays 226a and 226b, are incorporated with the base stations 222, 224, and 226, respectively. In this regard, the antenna arrays 222a and 222b, 224a and 224b, and 226a and 226b may be coordinated and may be arranged at a different and sufficiently uncorrelated direction to create several independent antenna arrays for accurate positioning of the mobile device 210.

The mobile device 210 may comprise a cell phone, laptop, tablet computer, PDA, wireless headset, pager, digital/video camera, toy, electronic book reader, and/or CD/DVD/cassette/MP-3 players. In some embodiments, the mobile device 210 may be a battery-less tag that receives wireless power through a wireless charger during the short periods of signal reception and channel estimation. The mobile device 210 may comprise multiple radios utilized to receive radio signals from the base stations 222, 224, and 226. The mobile device 210 may comprise multiple transceivers each with an antenna array to receive radio signals from the base stations. In other embodiments the mobile device 210 may deploy distributed transceiver structure as well. In this case the channel measurements to one or all of transceivers within the mobile device 210 may be used for position matching. All or only the most suitable transceiver within the mobile device 210 may be selected for positioning. If the transceivers within the mobile device 210 deploy antenna arrays as well, then the device's orientation data, from an embedded compass, gyroscope, etc., for example, may take into account device's orientation in correlation channel measurements. With reflections from surrounding objects such as, for example, multipath reflectors 241 through 245, the mobile device 210 may be operable to receive direct LOS radio waves over direct paths as well as reflected (multipath) radio waves wave (non-LOS radio waves) over multipaths. For example, the mobile device 210 placed at position 1 with coordinates of (x, y, z) may receive two direct LOS radio waves 232 and 233 from the base station 222 and the base station 224, and four multipath radio waves 231a, 234a, 235a, and 236a caused by reflections from obstacles, the multipath reflectors 241 through 244, respectively.

The reflectors 241-244 in FIG. 2 may be random natural reflectors in the environment that are exploited by the system for improved positioning. In another embodiment, high efficiency passive and/or active reflectors are installed in the environment for stronger and controlled multipaths for better positioning accuracy. In some embodiments, the installed reflectors' locations with respect to base stations are known and exploited for positioning. This positioning method, however, may be also applicable to situations where there are no reflectors present, because the channel measurements for the received signals are determined for LOS measurements as well as non-LOS measurements. In situations where the environment does not produce multipaths, however, time-delay triangulation positioning methods may also be used as an alternative, such as that described in "Method and system for determining the position of a mobile station", Mehran Moshfeghi, U.S. application Ser. No. 61/224,347 filed on Jul. 9, 2009.

Figure 3:
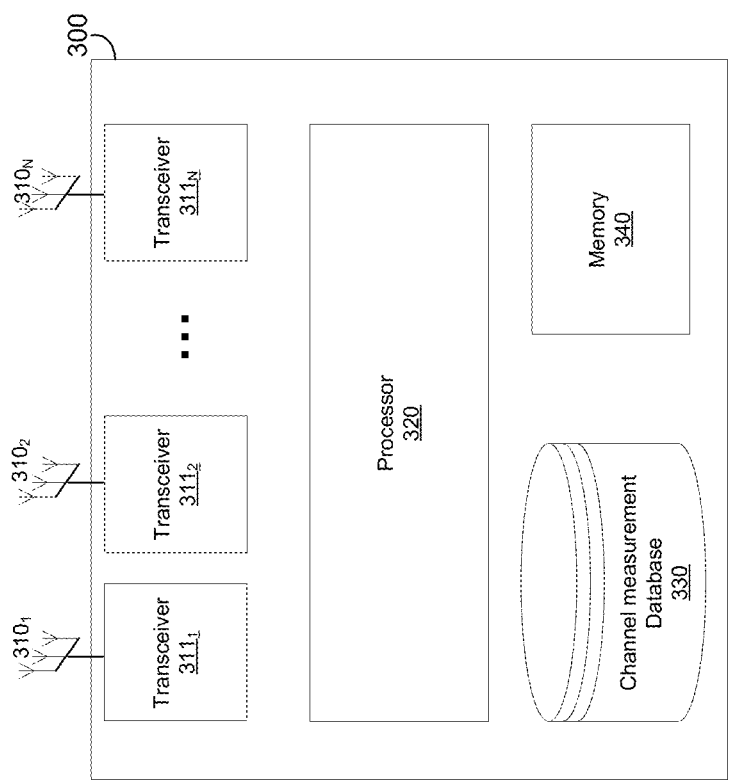
FIG. 3 is a diagram illustrating an exemplary base station that utilizes multiple distributed transceivers with array processing for device positioning, in accordance with an embodiment of the invention.

FIG. 3 is a diagram illustrating an exemplary base station that utilizes multiple distributed transceivers with array processing for device positioning, in accordance with an embodiment of the invention. Referring to FIG. 3, there is shown a base station 300. The base station 300 comprises a plurality of transceivers $311_1, 311_2, \ldots, 311_N$, a processor 320, a channel measurement database 330, and a memory 340.

The transceivers $311_1, 311_2, \ldots, 311_N$ may comprise suitable logic, circuitry, interfaces and/or code that may be operable to receive and/or transmit radio frequency signals from and/or to the multi-radio mobile devices 112-116 using air interface protocols specified in, for example, UMTS, GSM, LTE, WLAN, 60 GHz/mmWave, and/or WiMAX. The transceivers $311_1, 311_2, \ldots, 311_N$ may be configured as distributed transceiver architecture. Each of the distributed transceivers $311_1, 311_2, \ldots, 311_N$ may be equipped with a programmable antenna array or fixed directional antenna. For example, antenna arrays $310_1, 310_2, \ldots, 310_N$ are incorporated with the distributed transceivers $311_1, 311_2, \ldots, 311_N$, respectively. The antenna arrays may be utilized for transmitting and/or receiving signals.

The antenna arrays $310_1, 310_2, \ldots, 310_N$ may comprise suitable logic, circuitry, interfaces and/or code that may be operable to generate antenna beam patterns to form a plurality of beams. The plurality of beams may be arranged to orient in specific directions such as a direction towards an intended mobile device to be located. In an embodiment of the invention, each of the antenna arrays $310_1, 310_2, \ldots, 310_N$ may be configured to utilize different antenna patterns and array configurations. For example, antenna patterns of the antenna array $310_1$ may be arranged by adjusting phase array coefficients for the distributed transceiver $311_1$. In this regard, each of the antenna arrays $310_1, 310_2, \ldots, 310_N$ may be arranged at a different and sufficiently uncorrelated direction so as to create several independent antenna arrays for accurate positioning of an intended device such as the multi-radio mobile device 112. In an embodiment of the invention, each of the antenna arrays $310_1, 310_2, \ldots, 310_N$ may be configured to be linear, planar, circular or hexagonal arrays so as to cover reflections in the multipath environment between the base station 300 and the multi-radio mobile device 112. In addition, the antenna arrays $310_1, 310_2, \ldots, 310_N$ may be arranged or configured to operate at different carrier frequencies $f_1, \ldots, f_K$. The number of transceivers N, and number of carrier frequencies K, may vary depending on device capability and available resources. In general, the carrier frequencies $f_1, \ldots, f_K$ may include a few frequencies in the 900 MHz band such as Bluetooth, a few in the 2.4 GH/5 GHz band such as WLAN, and a few in the 60 GHz band such as mmWave.

The processor 320 may comprise suitable logic, circuitry, interfaces and/or code that may be operable to manage and/or control operations of associated device components such as the distributed transceivers $311_1, 311_2, \ldots, 311_N$. The processor may generate training or pilot signals in the case that channel estimations may be performed at the mobile device. The processor 320 may perform the channel estimation in the case that the mobile device transmits the signal. The processor 320 may compile and analyze the database of collected measurements during scanning for partitioning them based on signature functions and achievable resolutions. The processor 320 may receive channel measurements reported from the multi-radio mobile device 112, for example. The received channel measurements may comprise channel quality information such as propagation channel responses, RSSIs or channel quality indicator (CQI) derived or captured at the multi-radio mobile device 112. The processor 320 may store the received channel measurements into the channel measurement database 330. In an embodiment of the invention, the processor 320 may configure and/or adjust phase array coefficients $w_i$, i=1, ..., N, for each of the distributed transceivers $311_1, 311_2, \ldots, 311_N$ based on channel quality information provided from the multi-radio mobile device 112. Each $w_i$, i=1, ..., N represents a vector that comprises the antenna coefficients used for each distributed transceiver. In this regard, the processor 320 may be operable to arrange or deploy the phase array coefficients $w_i$, i=1, ..., N, to span and cover reflections in the multipath environment that create reasonably strong multipaths between the base station 300 and the multi-radio mobile device 112. In an embodiment of the invention, the processor 320 may determine or select which of the distributed transceivers $311_1, 311_2, \ldots, 311_N$ may be activated for transmissions to the multi-radio mobile device 112. The processor 320 may place the activated distributed transceivers $311_1, 311_2, \ldots, 311_N$ to operate at different frequencies $f_1, \ldots, f_K$ for transmissions to the multi-radio mobile device 112.

The channel measurement database 330 may comprise suitable logic, circuitry, interfaces and/or code that may be operable to store channel measurements supplied from associated mobile devices such as the mobile devices 112-116. The stored channel measurements may be utilized to configure or adjust the distributed transceivers $311_1, 311_2, \ldots, 311_N$ to various antenna patterns and array configurations. The channel measurement database 330 may be operable to manage and update the stored channel measurements whenever necessary. The updates may occur aperiodically or periodically. For example, the channel measurement database 330 may be utilized to refine the stored channel measurements based on information on corresponding antenna patterns and transmit array configurations.

The memory 340 may comprise suitable logic, circuitry, interfaces and/or code that may be operable to store information such as executable instructions and data that may be utilized by the processor 320 and/or other associated component units such as, for example, the reference database 330. The memory 340 may comprise RAM, ROM, low latency nonvolatile memory such as flash memory and/or other suitable electronic data storage.

In an exemplary operation, the processor 320 may be operable to control operations of, for example, the distributed transceivers $311_1, 311_2, \ldots, 311_N$. The processor 320 may receive or collect channel measurements from users such as the multi-radio mobile device 112. Phase array coefficients $w_i$, i=1, ..., N, for each of the distributed transceivers $311_1, 311_2, \ldots, 311_N$ may be configured or adjusted based on the channel measurements provided from the multi-radio mobile device 112. In this regard, the phase array coefficients $w_i$, i=1, ..., N, may be arranged to span and cover reflections in the multipath environment between the base station 300 and the multi-radio mobile device 112. The distributed transceivers $311_1, 311_2, \ldots, 311_N$ may be selectively activated for transmissions or receptions, at different frequencies $f_1, \ldots, f_K$, for example, to the multi-radio mobile device 112 based on the channel measurements provided from the multi-radio mobile device 112.

Figure 4:
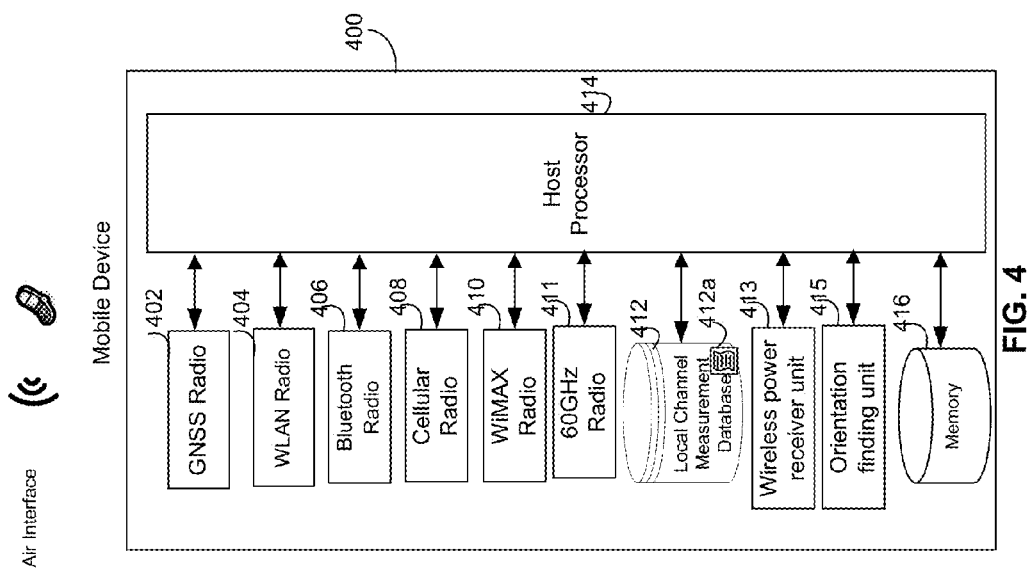
FIG. 4 is a diagram illustrating an exemplary mobile device that is located utilizing a collection of distributed transceivers with array processing, in accordance with an embodiment of the invention.

FIG. 4 is a diagram illustrating an exemplary mobile device that is located utilizing a collection of distributed transceivers with array processing, in accordance with an embodiment of the invention. Referring to FIG. 4, there is shown a multi-radio mobile device 400. The multi-radio mobile device 400 comprises a GNSS radio 402, a WLAN radio 404, a Bluetooth radio 406, a cellular radio 408, a WiMAX radio 410, a 60 GHz radio 411, a local multipath database 412, a wireless power receiver unit 413, an orientation finding unit 415, a host processor 414 and a memory 416.

The GNSS radio 402 may comprise suitable logic, circuitry, interfaces and/or code that may be operable to detect and receive GNSS signals from a plurality of visible GNSS satellites such as the GNSS satellite 132-136. The GNSS radio 402 may be operable to utilize the received GNSS signals to calculate or determine navigation information such as a GNSS position and/or a velocity of the GNSS radio 402. The calculated GNSS position of the GNSS radio 402 may be provided to the host processor 414, where it may be utilized to support location-based services. In instances where other radios such as the WLAN radio 404 and the cellular radio 408, for example, are receiving corresponding RF signals at the calculated GNSS position of the GNSS radio 402, or at a known location, channel measurements for the received RF signals over the WLAN radio 404 and the cellular radio 408 may be location stamped utilizing the calculated GNSS position of the GNSS radio 402, or utilizing the known location.

The WLAN radio 404 may comprise suitable logic, circuitry, interfaces and/or code that may be operable to receive and/or transmit radio frequency signals using wireless LAN technology. The WLAN radio 404 may be operable to transmit and/or receive radio frequency (RF) signals over WLAN connections between the multi-radio mobile device 400 and a WLAN AP such as the WLAN AP 121a. In instances where the WLAN radio 404, at the calculated GNSS position of the GNSS radio 402, or at a known location, is receiving RF signals from the WLAN AP 121a, channel measurements for the received RF signals over the WLAN radio 404 may be location stamped utilizing the calculated GNSS position of the GNSS radio 402, or utilizing the known location.

The Bluetooth radio 406 may comprise suitable logic, circuitry, interfaces and/or code that may be operable to receive and/or transmit radio frequency signals using Bluetooth technology. The Bluetooth radio 406 may be operable to transmit and/or receive radio frequency (RF) signals over Bluetooth connections between the multi-radio mobile device 400 and a Bluetooth AP such as the Bluetooth AP 122a. In instances where the Bluetooth radio 406, at the calculated GNSS position of the GNSS radio 402, or at a known location, is receiving RF signals from the Bluetooth AP 122a, channel measurements for the received RF signals over the Bluetooth radio 406 may be location stamped utilizing the calculated GNSS position of the GNSS radio 402, or utilizing the known location.

The cellular radio 408 may comprise suitable logic, circuitry, interfaces and/or code that may be operable to receive and/or transmit radio frequency signals using various cellular technologies such as, for example, CDMA, UMTS, GSM and/or LTE. The cellular radio 408 may be operable to transmit and/or receive radio frequency (RF) signals over cellular radio connections between the multi-radio mobile device 400 and a cellular base station such as the base station 123a in the CDMA network 123. In instances where the cellular radio 408, at the calculated GNSS position of the GNSS radio 402, or at a known location, is receiving RF signals from the base station 123a, channel measurements for the received RF signals over the cellular radio 408 may be location stamped utilizing the calculated GNSS position of the GNSS radio 402, or utilizing the known location.

The WiMAX radio 410 may comprise suitable logic, circuitry, interfaces and/or code that may be operable to receive and/or transmit radio frequency signals using WiMAX technology. The WiMAX radio 410 may be operable to transmit and/or receive radio frequency (RF) signals over WiMAX radio connections between the multi-radio mobile device 400 and a WiMAX base station such as the base station 125a in the WiMAX network 125. In instances where the WiMAX radio 410, at the calculated GNSS position of the GNSS radio 402, or at a known location, is receiving RF signals from the base station 125a, channel measurements for the received RF signals over the WiMAX radio 410 may be location stamped utilizing the calculated GNSS position of the GNSS radio 402, or utilizing the known location.

The 60 GHz radio 411 may comprise suitable logic, circuitry, interfaces and/or code that may be operable to receive and/or transmit radio frequency signals in a 60 GHz frequency band.

The local channel measurement database 412 may comprise suitable logic, circuitry, interfaces and/or code that may be operable to record and store data related to local multipath environment information, which may comprise channel measurements, channel transmit diversity settings, and locations where the channel measurements are captured or determined. The channel transmit diversity settings may comprise information such as radio site identifier index, transceiver index, transceiver operating frequency, transmit antenna patterns and array configurations. The channel measurements may be characterized by channel responses (channel strength and group delay), or RSSIs. The stored channel measurements may be provided to the corresponding radio sites such as the base station 300. The provided channel measurements may be utilized by the base station 300 to configure the distributed transceivers $311_1$, $311_2$, . . . , $311_N$, and/or to adjust phase array coefficients so as to cover reflections in the multipath environment between the base station 300 and the multi-radio mobile device 400. The channel measurements with corresponding channel transmit diversity settings may be uploaded or communicated to the location server 140 to build and/or refine the positioning database 142. Content in the local channel measurement database 412 may be arranged or stored in a lookup table 412a, for example. The local channel measurement database 412 may be updated or refined on an as needed basis, aperiodically or periodically.

The wireless power receiver unit 413 may comprise suitable logic, circuitry, interfaces and/or code that may be operable to receive and/or collect power transmitted from wireless power transmitters. For example, the wireless power receiver unit 413 may comprise a low power receiver when it is a consumer product such as a mobile phone or battery, capable of receiving no more than 5 Watt from a wireless power transmitter.

The host processor 414 may comprise suitable logic, circuitry, interfaces and/or code that may be operable to manage, coordinate and/or control operations of associated device component units such as, for example, the GNSS radio 402, the cellular radio 408, and/or the local channel measurement database 312, depending on usages. For example, the host processor 414 may be operable to activate or deactivate one or more associated radios such as the GNSS radio 402 on an as needed basis in order to save power. Depending on device capabilities and user preferences, the host processor 414 may be operable to utilize or enable associated radios such as the WLAN radio 404 and the cellular radio 408 to receive signals for a desired service in a multipath environment. In this regard, the host processor 414 may process the received signals to determine or measure channel characteristics such as, for example, channel response or RSSIs, for the received signals. In an embodiment of the invention, the host processor 414 may be operable to provide or report channel measurements to the corresponding radio sites such as the base station 300. The channel measurement report may be utilized by the base station 300 to configure the distributed transceivers $311_1$, $311_2$ and $311_N$ and/or to adjust phase array coefficients to cover reflections in the multipath environment between the base station 300 and the multi-radio mobile device 400. In an embodiment of the invention, the host processor 414 may be operable to provide channel measurements from the local channel measurement database 412 to the location server 140 to build the positioning database 142 for higher positioning resolution.

The orientation finding unit 415 may comprise suitable logic, circuitry, interfaces and/or code that may be operable to identify or find orientation information for the mobile device 400. The orientation finding unit 415 may comprise a gyroscope and/or an accelerometer.

The memory 416 may comprise suitable logic, circuitry, interfaces and/or code that may be operable to store information such as executable instructions and data that may be utilized by the host processor 414 and/or other associated component units such as, for example, the WLAN radio 404 and the Bluetooth radio 406. The memory 416 may comprise RAM, ROM, low latency nonvolatile memory such as flash memory and/or other suitable electronic data storage.

In an exemplary operation, the host processor 414 may be operable to utilize associated radios such as the WLAN radio 404 and the WiMAX radio 410 to receive radio frequency signals from radio sites such as the WLAN AP 121a and the base station 125a, respectively. The host processor 414 may process or measure the received signals to determine channel characteristics such as, for example, channel response or RSSIs, for the received signals. The host processor 414 may communicate the channel measurements to the corresponding radio sites such as the base station 125a to adjust channel transmit diversity settings such as the configuration of antenna patterns and phase array coefficients for the distributed transceivers $311_1$, $311_2$ and $311_N$. The host processor 414 may provide the channel measurements to the location server 140 to build and/or refine the positioning database 142.

Figure 5:
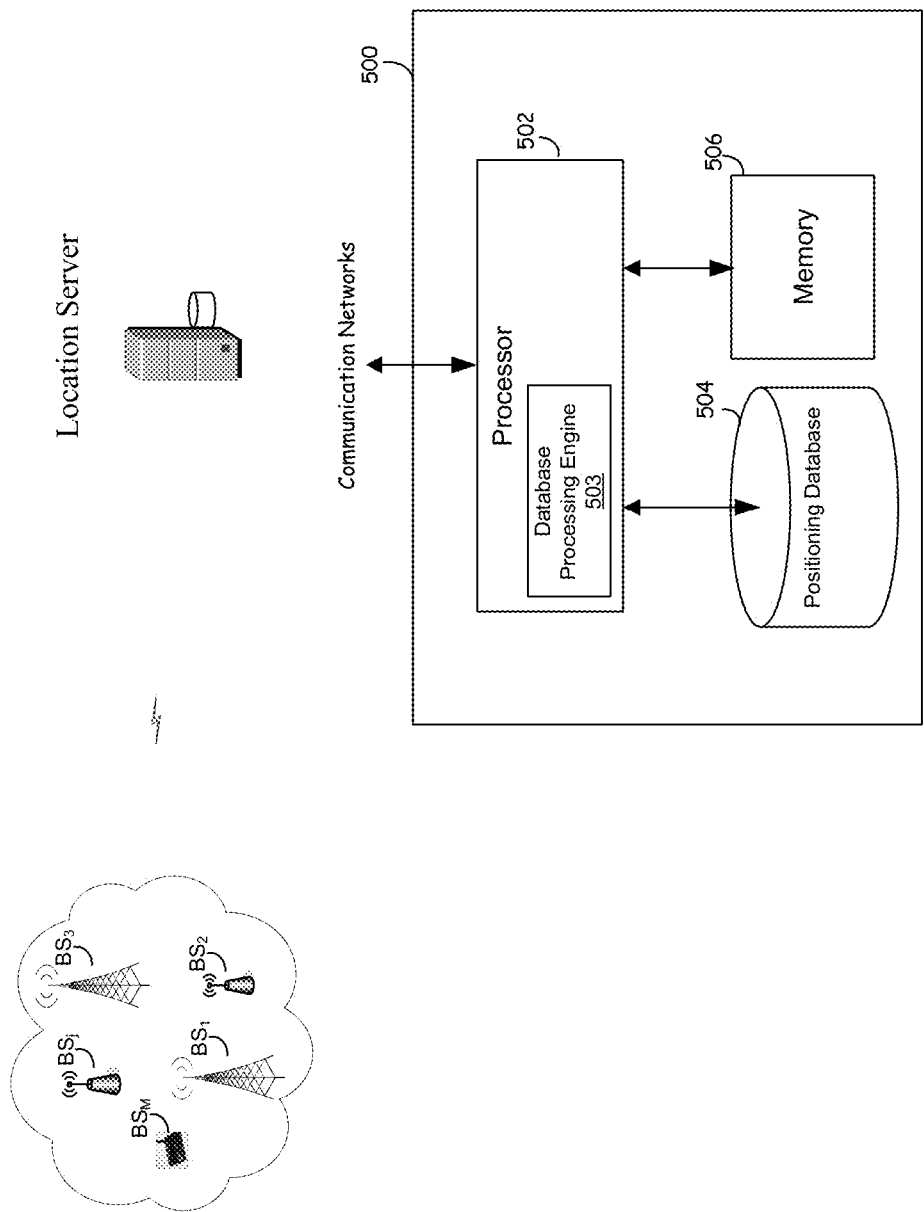
FIG. 5 is a diagram illustrating an exemplary location server that performs device positioning utilizing a signature-based positioning database, in accordance with an embodiment of the invention.

FIG. 5 is a diagram illustrating an exemplary location server that performs device positioning utilizing a signature-based positioning database, in accordance with an embodiment of the invention. Referring to FIG. 5, there is shown a location server 500. The location server 500 comprises a processor 502, a positioning database 504 and a memory 506. The location server 500 may be a remote/separate server or integrated into one of the base stations.

The processor 502 may comprise suitable logic, circuitry, interfaces and/or code that may be operable to manage and/or control operations of the positioning database 504 and the memory 506. The processor 502 may be operable to communicate with the heterogeneous network system 120 to collect and/or retrieve channel measurements to build the positioning database 504 for device positioning. The processor 502 may comprise a database processing engine 503 responsible for coordination of database processing activities.

The database processing engine 503 may comprise suitable logic, circuitry, interfaces and/or code that may be operable to handle or perform database processing for the location server 500. Assume that M base stations and/or APs, denoted as $BS_j$, $j=1, \ldots, M$, are selected and utilized by the location server 500 to estimate the position (x, y, z) in a three dimensional (3D) Cartesian coordinate system for a device to be located, for example, the multi-radio mobile device 112. The base stations $BS_j$, $j=1, \ldots, M$, may be configured to utilize a collection of $N_j$ distributed transceivers $i=1, \ldots, N_j$ for transmissions to the device to be located. Each of the distributed transceivers $i=1, \ldots, N_j$ may be equipped with one of independently configurable antenna arrays, $i=1, \ldots, N_j$. Each of the distributed transceivers $i=1, \ldots, N_j$ may be configured to operate at different carrier frequencies $f_{k,i}{}^j = f_{1,i}{}^j, \ldots, f_{K_j,i}{}^j$. Furthermore, assume $w_{1,i}{}^j, \ldots, w_{S,i}{}^j$ represent the phase array coefficients of the $i^{th}$ transceiver for the base stations $BS_j$, $i=1, \ldots, N_j$; $j=1, \ldots, M$. The phase array coefficients of $w_{s,i}{}^j$, $s=1, \ldots, S$, may comprise a vector of a size equal to number of antenna elements deployed at the $i^{th}$ transceiver of the base station $BS_j$, where S represents the total number of array coefficients that are used/exercised at the base station for positioning. The set $\{j, i, f_{k,i}{}^j, w_{s,i}{}^j\}$, where $j=1, \ldots, M$; $i=1, \ldots, N_j$; $f_{k,i}{}^j = f_{1,i}{}^j, \ldots, f_{K_j,i}{}^j$; $w_{s,i}{}^j = w_{1,i}{}^j, \ldots, w_{S,i}{}^j$, comprises various transmit diversity settings for channels from the base stations $BS_j$, $j=1, \ldots, M$, to the device to be located. The number of transceivers $N_j$ and number of carrier frequencies $K_j$ available for each of the base stations $BS_j$, $j=1, \ldots, M$, may vary depending on system configuration.

In an embodiment of the invention, the database processing engine 503 may be operable to select or identify a location scanning region $R_s$ for the device to be located. The database processing engine 503 may be operable to scan each location (x, y, z) within the location scanning region $R_s$. Corresponding channel measurements collected at each scanned location may be utilized to estimate the position for the device to be located. In telecommunication, a radio channel may be characterized by channel strength and group delay (channel phase measurement). Signature-based channel measurements are referred to as channel measurements derived from channel signatures or transfer functions. Assume $H\{j, i, f_{k,i}{}^j, w_{s,i}{}^j\}$ represents signature-based channel measurements for the device to be located, and $H_0\{j, i, f_{k,i}{}^j, w_{s,i}{}^j\}$ represents signature-based channel measurements collected at each scanned location (x, y, z)∈$R_s$, where, $j=1, \ldots, M$; $i=1, \ldots, N_j$; $f_{k,i}{}^j = f_{1,i}{}^j, \ldots, f_{K_j,i}{}^j$; $w_{s,i}{}^j = w_{1,i}{}^j, \ldots, w_{S,i}{}^j$. At each scanned location (x, y, z)∈$R_s$, the database processing engine 503 may be operable to instruct the base stations $BS_j$, $j=1, \ldots, M$, to conduct or perform measuring a set of $H_0\{j, i, f_{k,i}{}^j, w_{s,i}{}^j\}$ over the transmit diversity configurations $\{j, i, f_{k,i}{}^j, w_{s,i}{}^j\}$ during the scanning phase. Specifically, the signature-based channel measurements $H_0\{j, i, f_{k,i}{}^j, w_{s,i}{}^j\}$ depend on scanned locations (x, y, z)∈$R_s$. For example, at a specific scanned location (x', y', z')∈$R_s$, $H_0\{j, i, f_{k,i}{}^j, w_{s,i}{}^j\}_{(x', y', z')}$ corresponds to a set of channel measurements conducted over the transmit diversity configurations $\{j, i, f_{k,i}{}^j, w_{s,i}{}^j\}$, where, $j=1, \ldots, M$; $i=1, \ldots, N_j$; $f_{k,i}{}^j = f_{1,i}{}^j, \ldots, f_{K_j,i}{}^j$; $w_{s,i}{}^j = w_{1,i}{}^j, \ldots, w_{S,i}{}^j$. In some embodiments, the transceivers at each base station may be configured according to the location server. Then the mobile device may perform the channel estimations and report them back to the location server or engine. In other embodiments, the mobile device may be instructed to transmit a signal while the transceivers at each base station are configured according to the location server and the base stations perform the channel estimations and report them back to the location server.

In an embodiment of the invention, the database processing engine 503 may be operable to define and utilize a signature function SF( ) to estimate or determine the position for the device to be located, for example, the multi-radio mobile device 112. In this regard, the signature function SF( ) may be defined or selected as a function of channel measurement for the device to be located, $H\{j, i, f_{k,i}{}^j, w_{s,i}{}^j\}$, and channel measurements at each previously scanned location, $H_0\{j, i, f_{k,i}{}^j, w_{s,i}{}^j\}$, over the transmit diversity configurations $\{j, i, f_{k,i}{}^j, w_{s,i}{}^j\}$. In other words, the signature function SF( ) may be expressed as $SF(H\{j, i, f_{k,i}{}^j, w_{s,i}{}^j\}, H_0\{j, i, f_{k,i}{}^j, w_{s,i}{}^j\})$. The database processing engine 503 may calculate values of SF(H ($\{j, i, f_{k,i}{}^j, w_{s,i}{}^j\}, H_0\{j, i, f_{k,i}{}^j, w_{s,i}{}^j\})$ for measured set of H$\{j, i, f_{k,i}{}^j, w_{s,i}{}^j\}$ against each previously collected $H_0\{j, i, f_{k,i}{}^j, w_{s,i}{}^j\}$ over each scanned location in the location scanning region $R_s$. The position estimation for the device to be located may be calculated or determined utilizing the following expression:

$$(\hat{x}, \hat{y}, \hat{z}) = \min_{(x,y,z) \in R_s} SF(H\{j, i, f_{k,i}^j, w_{s,i}^j\}, H_0\{j, i, f_{k,i}^j, w_{s,i}^j\}) \quad (1)$$

where, $j=1, \ldots, M$; $i=1, \ldots, N_j$; $f_{k,i}{}^j = f_{1,i}{}^j, \ldots, f_{K_j,i}{}^j$; $w_{s,i}{}^j = w_{1,i}{}^j, \ldots, w_{S,i}{}^j$, and (x, y, z) are scanned locations within the location scanning region $R_s$. The position estimation ($\hat{x}$, $\hat{y}$, $\hat{z}$) resulting in the minimum signature function SF( ) is considered as the most likelihood location estimate for the device to be located, such like the multi-radio mobile device 112.

Depending on location accuracy requirements, the database processing engine 503 may be operable to coordinate with the positioning database 504 so as to optimize database processing. For example, the database processing engine 503 may be operable to calculate the signature function SF(H$\{j, i, f_{k,i}{}^j, w_{s,i}{}^j\}, H_0\{j, i, f_{k,i}{}^j, w_{s,i}{}^j\})$, $j=1, \ldots, M$; $i=1, \ldots, N_j$; $f_{k,i}{}^j = f_{1,i}{}^j, \ldots, f_{K_j,i}{}^j$; $w_{s,i}{}^j = w_{1,i}{}^j, \ldots, w_{S,i}{}^j$, and may repeat the calculation at possible position candidates $p_1, \ldots, p_T$, for the most likelihood location estimate ($\hat{x}$, $\hat{y}$, $\hat{z}$) for the device to be located. In an embodiment of the invention, several different signature functions SF( ) may be defined and utilized depending on accuracy requirements, availability of antenna arrays, target location acquisition time, processing power consumption, and/or multipath environment or conditions. For example, a signature function SF( ) with a sufficiently large gradient versus locations $(x, y, z) \in R_s$ may be selected or utilized for a low position estimation error. The slope of the signature function $SF(H\{j, i, f_{k,i}{}^j, w_{s,i}{}^j\}, H_0\{j, i, f_{k,i}{}^j, w_{s,i}{}^j\})$ versus locations $(x, y, z) \in R_s$ may be considered as a measure of location resolution capability of the signature function SF( ) definition and the positioning database 504. To quantify the location resolution and/or reliability at each $(x, y, z) \in R_s$ and for the signature function SF( ) definition, the signature function $SF(H\{j, i, f_{k,i}{}^j, w_{s,i}{}^j\}, H_0\{j, i, f_{k,i}{}^j, w_{s,i}{}^j\})$ in Equation (1) may be calculated by substituting $H\{j, i, f_{k,i}{}^j, w_{s,i}{}^j\}$ with channel measurements at all the available scanned locations $(x, y, z) \in R_s$, and using $H_0\{j, i, f_{k,i}{}^j, w_{s,i}{}^j\}$ as the channel measurement set for scanned location $(x_+, y_+, z_+)$ in the region $R_s$. The gradient of the above calculated SF( ) values versus the scanned locations $(x, y, z) \in R_s$ and around the location $(x_+, y_+, z_+)$ may be utilized as an indication of resolution or accuracy for location estimation around the location $(x_+, y_+, z_+)$. A signature function SF( ) may be defined utilizing metrics such as, for example, full channel response, RSSI, strongest multipath and/or angle of arrival (AoA), as following:

$$SF(\ ) = sum\{\|H\{j,i,f_{k,i}{}^j,w_{s,i}{}^j\} - H_0\{j,i,f_{k,i}{}^j,w_{s,i}{}^j\}\|^2\} \text{ over } \{j,i,f_{k,i}{}^j,w_{s,i}{}^j\} \quad (2)$$

corresponding to full channel response based signature function. In this case channel responses may be compared coherently which includes both amplitude and phase of channel measurements.

$$SF(\ ) = sum\{\|H\{j,i,f_{k,i}{}^j,w_{s,i}{}^j\}\|^2 - \|H_0\{j,i,f_{k,i}{}^j,w_{s,i}{}^j\}\|^2\} \text{ over } \{j,i,f_{k,i}{}^j,w_{s,i}{}^j\} \quad (3)$$

corresponding to RSSI based signature function.

$$SF(\ ) = sum\{max\|H\{j,i,f_{k,i}{}^j,w_{s,i}{}^j\}\|^2 - max\|H_0\{j,i,f_{k,i}{}^j,w_{s,i}{}^j\}\|^2\} \text{ over } \{j,i,f_{k,i}{}^j,w_{s,i}{}^j\} \quad (4)$$

corresponding to strongest-multipath based signature function.

$$SF(\ ) = AoA(H\{j,i,f_{k,i}{}^j,w_{s,i}{}^j\}, H\{j,i,f_{k,i}{}^j,w_{s,i}{}^j\}) \text{ over } \{j,i,f_{k,i}{}^j,w_{s,i}{}^j\} \quad (5)$$

corresponding to angle-of-arrival based signature function. In the above equation (5), the AOA( ) function may be utilized to calculate the angle-of-arrival difference between the channel measurements $H\{j, i, f_{k,i}{}^j, w_{s,i}{}^j\}$ and $H_0\{j, i, f_{k,i}{}^j, w_{s,i}{}^j\}$ in the cases where an antenna array at the receiver side may be available, that is, when the mobile device deploys an antenna array or when the base stations with antenna arrays are performing the channel measurements.

$$SF(\ ) = sum\{abs(TDOA(H\{j,i,f_{k,i}{}^j,w_{s,i}{}^j\}) - TDOA(H_0\{j,i,f_{k,i}{}^j,w_{s,i}{}^j\}))\} \text{ over } \{j,i,f_{k,i}{}^j,w_{s,i}{}^j\} \quad (6)$$

corresponding to time-difference-of-arrival (TDOA)-based signature function. In the above equation (6), the TDOA( ) function may be utilized to calculate the time-difference between the arrival of received corresponding multipaths within measured channel responses $H\{j, i, f_{k,i}{}^j, w_{s,i}{}^j\}$. The above time-difference may be calculated as the difference between the first and second strongest paths within each channel response. In more general case, the time difference may be calculated between the first path and second, between the second and third, and so forth.

In all above descriptions, $\|\cdot\|^2$ is the Euclidean complex amplitude of a set of vectors (i.e., a matrix). In general, each element of channel measurement (H, $H_0$) may be a complex number with phase and amplitude.

$$SF(\ ) = sum\{\|abs(H\{j,i,f_{k,i}{}^j,w_{s,i}{}^j\}) - abs(H_0\{j,i,f_{k,i}{}^j,w_{s,i}{}^j\})\|^2\} \text{ over } \{j,i,f_{k,i}{}^j,w_{s,i}{}^j\} \quad (7)$$

where abs( ) represents the magnitude function. Equation (7) corresponds to full channel response based signature function but the channel responses may be compared incoherently which includes only amplitude of channel measurements.

In the above signature function variations, a time-alignment process may be applied to channel response measurements collected during scanning and positioning phases. The purpose of this process is to align and compensate for differences between the timers of scanning device (used during scanning phase) and the mobile device (being located). In one configuration, the base stations are all considered synchronized in time. In this case, only a time-alignment between the scanning device and mobile device is required (base stations are synchronized in time). To implement this, a subset of channel response measurements may be used by the location server to estimate the timers' difference between the scanning and mobile devices. For example, the location server 500 analyzes a few of channel measurements corresponding to a subset of transmit diversity configurations. By evaluating the first/strongest arriving element of channel response (first multipath) between the scanning and location phases, the location server 500 may then align all the measured channel responses to compensate for such time or timers' difference. In another configuration where the base stations are not synchronized in time, the above time alignment is repeated and applied separately to channel measurements corresponding to every base station. Therefore, the time or timers' difference between the device and each base station is compensated or accounted for, separately.

In one embodiment, as a different method, the task of synchronizing measurements between the scanning and mobile devices may be combined into the signature function minimization criterion. In an exemplary operation, the SF{ } operation in equation be modified as follows:

$$SF(\ ) = sum\{\|H\{j,i,f_{k,i}{}^j,w_{s,i}{}^j\}(t-\tau) - H_0\{j,i,f_{k,i}{}^j,w_{s,i}{}^j\}(t)\|^2\} \text{ over } \{j,i,f_{k,i}{}^j,w_{s,i}{}^j\} \quad (8)$$

where $H_0\{j, i, f_{k,i}{}^j, w_{s,i}{}^j\}(t)$ represents the channel measurement (from scanning phase) in time domain and $H\{j, i, f_{k,i}{}^j, w_{s,i}{}^j\}(t)$ represents the channel measurement (from mobile device being located). The parameter ($\tau$) represents the time difference between the timers of scanning and mobile devices. In a joint optimization method, the above SF{ } is minimized over and parameter ($\tau$). Therefore, the minimization process may find the best value for ($\tau$) that may re-align the channel measurements to the best possible (hence minimizing the difference between $H\{j, i, f_{k,i}{}^j, w_{s,i}{}^j\}$ and $H_0\{j, i, f_{k,i}{}^j, w_{s,i}{}^j\}$. Other SF{ } function may be similarly modified to include the above synchronization method.

In some embodiments related to SF{ } in equations (2)-(4), a "weighted sum" is used to combine the values corresponding to $\{j, i, f_{k,i}{}^j, w_{s,i}{}^j\}$ configurations. In an exemplary operation, the location server 500 may utilize a set of scaling factors $\alpha\{j, i, f_{k,i}{}^j, w_{s,i}{}^j\}$ where these scaling factors model the relative reliability and contribution of the channel measurements per each transmit diversity configuration. For example, for j values corresponding to base stations that are identified to be closer to the mobile device (during coarse estimation), the corresponding $\alpha$ values would take a larger relative value. Similarly, for measurements corresponding to high carrier frequencies, larger scaling factors may be used when a small region is being scanned (since higher carrier frequencies provide better resolution over limited smaller regions). According to this embodiment, Equation (2) may be modified and used as follows:

$$SF(\ ) = sum\{\alpha\{j,i,f_{k,i}{}^j,w_{s,i}{}^j\} \times \|H\{j,i,f_{k,i}{}^j,w_{s,i}{}^j\} - H_0\{j,i,f_{k,i}{}^j,w_{s,i}{}^j\}\|^2\} \text{ over } \{j,i,f_{k,i}{}^j,w_{s,i}{}^j\} \quad (2\text{-}b)$$

Equation (2-b) corresponds to a full channel response based signature function with unequal scaling factors.

It may be also possible to do channel measurement for the same frequency with different waveforms or modulations. For example, Bluetooth and Wi-Fi both may use the 2.4 GHz frequency spectrum. This is yet another dimension for channel measurements. The scaling factor $\alpha$ may also be applied to such channel measurements based on their reliability. For example, Bluetooth may be given a smaller weight compared to Wi-Fi.

In an embodiment of the invention, the location accuracy and position estimation error may be calculated for one or more subsets of the channel measurements at scanned locations $(x, y, z) \in R_s$, $H\{j, i, f_{k,i}^j, w_{s,i}^j\}$, instead of using the entire parameter indices. For example, instead of using $H\{j, i, f_{k,i}^j, w_{s,i}^j\}$ for the entire of $i=1, \ldots, N_j$ transceivers within the base stations $BS_j$, $j=1, \ldots, M$, the database processing engine 503 may utilize a subset or portion of $i=1, \ldots, N_j$ transceivers for calculating signature function $SF(H\{j, i, f_{k,i}^j, w_{s,i}^j\}, H_0\{j, i, f_{k,i}^j, w_{s,i}^j\})$ and consequently the location estimation resolution or error. The above process may be applied to various combinations to sort the positioning database 504 in terms of estimation resolution and error. In instances where it is identified that adding an element from the positioning database 504 to the channel measurements at scanned locations $(x, y, z) \in R_s$, $H\{j, i, f_{k,i}^j, w_{s,i}^j\}$ used for $SF(H\{j, i, f_{k,i}^j, w_{s,i}^j\}, H_0\{j, i, f_{k,i}^j, w_{s,i}^j\})$ calculation doesn't improve the resolution or accuracy above a target or programmable threshold, that element may be eliminated or removed from the set used for positioning around a particular location point such as $(x_+, y_+, z_+) \in R_s$. For example, assume using antenna phase array coefficients of $w_{s,i}^j$ doesn't improve the location accuracy or error by a programmable threshold, then the antenna phase array coefficients of $w_{s,i}^j$ may not be utilized for positioning the mobile device in region $R_s$ to simplify the positioning and make the measurements collection faster. Similar filtering may be applied to other variables such as carrier frequencies used ($f_{k,i}^j$) base stations used (j), and transceivers used (i).

In an embodiment of the invention, a filtering method may be used to sort or reduce the number of required configurations. For example, consider a sub-region $R'_s$, the location server 500 may analyze all the measurements collected for this region during the scanning phase and identify the transmit diversity configurations that do not contribute substantially to the location accuracy in the region $R'_s$. For this task, the location server 500 may utilize the following procedure. First, the location server 500 may analyze the data collected from the scanning phase. Second, the location server 500 may take a single scanned location in the region $R'_s$, say $(x_+, y_+, z_+) \in R'_s$. Next, the server 500 may calculate $SF(H\{j, i, f_{k,i}^j, w_{s,i}^j\}, H_0\{j, i, f_{k,i}^j, w_{s,i}^j\})$ versus all scanned locations $(x, y, z) \in R'_s$ with respect to location $(x_+, y_+, z_+) \in R'_s$. In other words, $H_0\{j, i, f_{k,i}^j, w_{s,i}^j\}$, corresponds to scanned channel measurements for location $(x_+, y_+, z_+) \in R'_s$ where $H\{j, i, f_{k,i}^j, w_{s,i}^j\}$ corresponds to scanned channel measurements for all other locations in $(x, y, z) \in R'_s$. By definition, the SF{ } values calculated will be minimum (i.e., zero) at location $(x_+, y_+, z_+)$ and may gradually increase for points in $(x, y, z) \in R'_s$ as they are further from $(x_+, y_+, z_+)$. The slope of this increase may be a measure of location accuracy/resolution achievable around point $(x_+, y_+, z_+)$ when SF{ } is used and all configurations are utilized. The above accuracy may be the best achievable with SF{ } at location $(x_+, y_+, z_+)$ or region $R'_s$ when all collected configurations are deployed. The location server 500 may store the result of the above analysis as accuracy that is achievable with this specific SF{ } and at region $R'_s$ when all configurations $j=1, \ldots, M$; $i=1, \ldots, N_j$; $f_{k,i}^j=f_{1,i}^j, \ldots, f_{K_j,i}^j$; $w_{s,i}^j=w_{1,i}^j, \ldots, w_{S,i}^j$ are utilized. In the next step, the location server 500 may repeat the above process except for a subset of configurations $j=1, \ldots, M$; $i=1, \ldots, N_j$; $f_{k,i}^j=f_{1,i}^j, \ldots, f_{K_j,i}^j$; $w_{s,i}^j=w_{1,i}^j, \ldots, w_{S,i}^j$ and stores the accuracy for that particular subset of configurations. At the end of the above procedure, the location server 500 may have a table for each sub-region $R'_s$ assigning achievable accuracy to each subset of $j=1, \ldots, M$; $i=1, \ldots, N_j$; $f_{k,i}^j=f_{1,i}^j, \ldots, f_{K_j,i}^j$; $w_{s,i}^j=w_{1,i}^j, \ldots, w_{S,i}^j$ configurations. The location server 500 may then utilize the above table for deciding what subset of configurations to utilize when positioning a mobile device. For example, once the location server 500 determines that the mobile device is in the sub-region $R'_s$ through some initial coarse estimation, the location server 500 may identify and use the matching table for that sub-region. Within the corresponding tables, the location server 500 then search for the desired accuracy requirements. The table may return a group of possible subsets of configurations that result in the required accuracy requirements. The location server 500 then picks the satisfying subset based on some other criterions (such as power consumption, number of measurements, number of base stations, etc.). For example, the location server 500 may pick the subset of configurations that has the least elements, which translates to the minimum number of channel measurements for the device (resulting in fastest or most efficient estimation process). The above process to create and populate the tables by the location server may be performed offline after the scanning measurements are collected so that the tables are readily available during the positioning of mobile devices.

In another embodiment, the above tables for each sub-region $R'_s$ may be repeated for a variety of SF{ } definitions. This may add an additional dimension to the tables; the SF{ } definition. Consequently, for a desired location accuracy in the sub-region $R'_s$, the location server 500 may pick the subset of configurations and the SF{ } based on other criterions such as minimizing the number of channel measurements.

In an embodiment of the invention, positioning configuration information may be stored by the database processing engine 503 for future use. The positioning configuration information may comprise various positioning filtering schemes or positioning scanning settings such as, for example, different SF( ) definitions, SF( ) accuracy or error associated with scanned locations $(x, y, z) \in R_s$ for different subsets of $\{j, i, f_{k,i}^j, w_{s,i}^j\}$, elements that do not improve the SF( ) accuracy/slope/error within a subset of $\{j, i, f_{k,i}^j, w_{s,i}^j\}$ for different SF( ) definitions, and different location scanning regions $R_s$. For example, using the stored positioning filtering schemes or positioning scanning settings, the number of antenna phase array coefficients of $w_{s,i}^j=W_{1,i}^j, \ldots, w_{S,i}^j$ needed to conduct measurements of $H\{j, i, f_{k,i}^j, w_{s,i}^j\}$ and $H_0\{j, i, f_{k,i}^j, w_{s,i}^j\}$ may be greatly reduced. This may result in less number of measurements with minimal degradation in device positioning. In some cases, according to the stored positioning configuration information during database processing, the database processing engine 503 may utilize a limited number such as one of $w_{1,i}^j, \ldots, w_{S,i}^j$ for the $i^{th}$ transceiver within the base stations $BS_j$, $j=1, \ldots, M$, for each scanned location point $(x, y, z) \in R_s$. For example, the single one of $w_{1,i}^j, \ldots, w_{S,i}^j$ may correspond to the antenna phase coefficients that create the best path or the best reflection from the $i^{th}$ transceiver to the device being located such as the multi-radio mobile device 112.

In some instances, matching and/or minimizing a single unified SF( ) definition of measurement data, $H\{j, i, f_{k,i}^j, w_{s,i}^j\}$ and $H_0\{j, i, f_{k,i}^j, w_{s,i}^j\}$, for the device to be located against the entire possible locations within the location scanning region $R_s$ may not yield a reliable or unique solution. Certain SF( ) definitions, however, may yield a very good resolution only over a subspace $R'_s$ within the location scanning region $R_s$. A brute-force calculation and comparison of various SF( ) definitions against the entire locations within the location scanning region $R_s$ may lead to multiple location estimates that correlate with the positioning database 504 with the minimum values of the corresponding SF( ) definitions in the location scanning region $R_s$ for the device to be located. In this regard, the variety of SF definitions that are available and applicable within the location scanning region $R_s$ utilized in the positioning database 504 may be limited for device positioning.

In an embodiment of the invention, the database processing engine 503 may utilize or perform multi-level positioning for highly accurate positioning. In this regard, the database processing engine 503 may utilize a coarse positioning method such as a GPS-based positioning or coarse angle-of-arrival method to establish or select an initial estimate for the subspace $R'_s$ in the location scanning region $R_s$ for the mobile device to be located. The subspace $R'_s \subset R_s$ corresponds to a boundary or range within the location scanning region $R_s$ where location scanning may be performed effectively to locate the device to be located. Once subspace $R'_s$ is identified, the database processing engine 503 may estimate the position for the device to be located by matching or correlating measurement data, $H\{j, i, f_k^j, w_i^j\}$ and $H_0\{j, i, f_k^j, w_i^j\}$, utilizing higher resolution SF( ) only in the subspace $R'_s \subset R_s$, but not the entire location scanning region $R_s$. The resulting location estimation for the device to be located may be utilize to refine the selection of the subspace $R'_s \subset R_s$, for example, by reducing choosing a smaller sized subspace $R''_s \subset R'_s \subset R_s$ for subsequent location estimate for the device to be located by using a different higher resolution SF( ) definition. In an embodiment of the invention, same set of scanned locations (x, y, z)$\in R_s$ may be revisited for new set of channel transmit diversity configurations, $\{j, i, f_k^j, w_i^j\}$, and possible new SF( ) definitions for subsequent finer location estimation for the device to be located. The multi-level positioning process may be basically repeated until the resolution requirements are met.

In one embodiment, the same method and database is utilized to perform the coarse initial location estimation. The initial coarse estimation is achieved by using only a subset of transmit diversity configurations $\{j, i, f_k^j, w_i^j\}$ that are identified to provide low positioning accuracy but full coverage over the region $R_s$. In an exemplary operation, the configurations with low carrier frequencies $f_{k,i}^j$ are selected for coarse initial positioning whereas configurations with higher carrier frequencies are used in next levels of positioning. In another exemplary operation, the base stations may have radio capability of operating at both WLAN channels (2.4 GHz and 5 GHz carrier frequencies) as well as mmWave channels (60 GHz carrier frequencies). This capability may be implemented through use of separate radios (one for WLAN operation and another for mmWave operation) or an integrated single radio covering all 2.4/5/60 GHz bands. In this case, configurations with $f_{k,i}^j$ around 2.4/5 GHz are used to estimate initial location of the mobile device. Such lower frequencies are expected to provide less resolution but cover a large region. Once this initial estimate is completed and a finer region for the mobile device is estimated, configurations with $f_{k,i}^j$ around 60 GHz are used for higher resolution estimation in accordance to other embodiments.

The multi-level positioning process may enable the use of higher resolution SF( ) definitions as well as eliminating ambiguity in pinpointing location. For example, once a coarse location estimate within the location scanning region $R_s$ is determined for the device to be located such as the multi-radio mobile device 112, the database processing engine 503 may look into the positioning database 504 for a subspace $R'_s \subset R_s$. The database processing engine 503 may specify or select a sub-set of channel transmit diversity configurations $\{j, i, f_{k,i}^j, w_{s,i}^j\}$ suitable for positioning within the subspace $R'_s \subset R_s$. For example, given the location estimation accuracy target, the database processing engine 503 identifies or selects only a set of two base stations, for example, $BS_1$ and $BS_3$, which may be sufficient to provide a location estimate for the device to be located. Assume that within the base station $BS_1$, the database processing engine 503 may choose the transceiver i=2 with antenna coefficients $w_{s=1,i=2}^{j=1}$ and $w_{s=2,i=2}^{j=1}$, choose the transceiver i=4 with antenna coefficients $w_{s=1,i=4}^{j=1}$ at carrier frequencies $f_{k=1,i=4}^{j=1}$ and $f_{k=2,i=4}^{j=1}$, and so forth. The base stations $BS_1$ and $BS_3$ may be instructed to conduct corresponding channel measurements either in parallel or sequential. Once the set of channel measurements $H\{j, i, f_{k,i}^j, w_{s,i}^j\}$ are collected, then the database processing engine 503 may calculate the SF( ) against all location points within the subspace $R'_s \subset R_s$ in the positioning database 504. The database processing engine 503 may consider the minimum value of the SF( ) calculated within the subspace $R'_s \subset R_s$ as a final indicator for location estimate. The above process may be repeated or continued for finer resolution. For example, a subsequent location estimation may be used to define or select a smaller location scanning region $R''_s$, where $R''_s \subset R'_s \subset R_s$. In another example, the positioning database 504 may be re-visited for a new set of transmit diversity configurations and possible new SF( ) definitions for next finer location estimation.

The positioning database 504 may comprise suitable logic, circuitry, interfaces and/or code that may be operable to manage and/or store data comprising channel measurements $H\{j, i, f_{k,i}^j, w_{s,i}^j\}$ learned from a plurality of associated radio sites such as base stations and/or APs. The contents in the positioning database 504 may be updated as needed, either aperiodically or periodically.

The memory 506 may comprise suitable logic, circuitry, interfaces and/or code that may be operable to store information comprising executable instructions, and configuration information, that may be utilized by the processor 502. The executable instructions may comprise algorithms that may be utilized to calculate location estimate for mobile devices using base stations with distributed transceivers through array processing. The memory 506 may comprise RAM, ROM, low latency nonvolatile memory such as flash memory and/or other suitable electronic data storage.

In an exemplary operation, the processor 502 may be operable to collect or track location related information of associated mobile devices to build the positioning database 504. Radio sites such as the base stations $BS_j$, j=1, . . . , M, each with i=1, . . . , $N_j$ distributed transceivers may be utilized by the database processing engine 503 for device positioning. In this regard, the database processing engine 503 may determine transmit diversity configurations and instruct the base stations $BS_j$, j=1, . . . , M, to conduct corresponding channel measurements. Various SF( ) definitions such as full channel response-based SF( ) definition may be selected for the channel measurements over a location scanning region $R_s$. A multi-level positioning process may be performed utilizing the positioning database 504 for highly accurate positioning.

Figure 6:
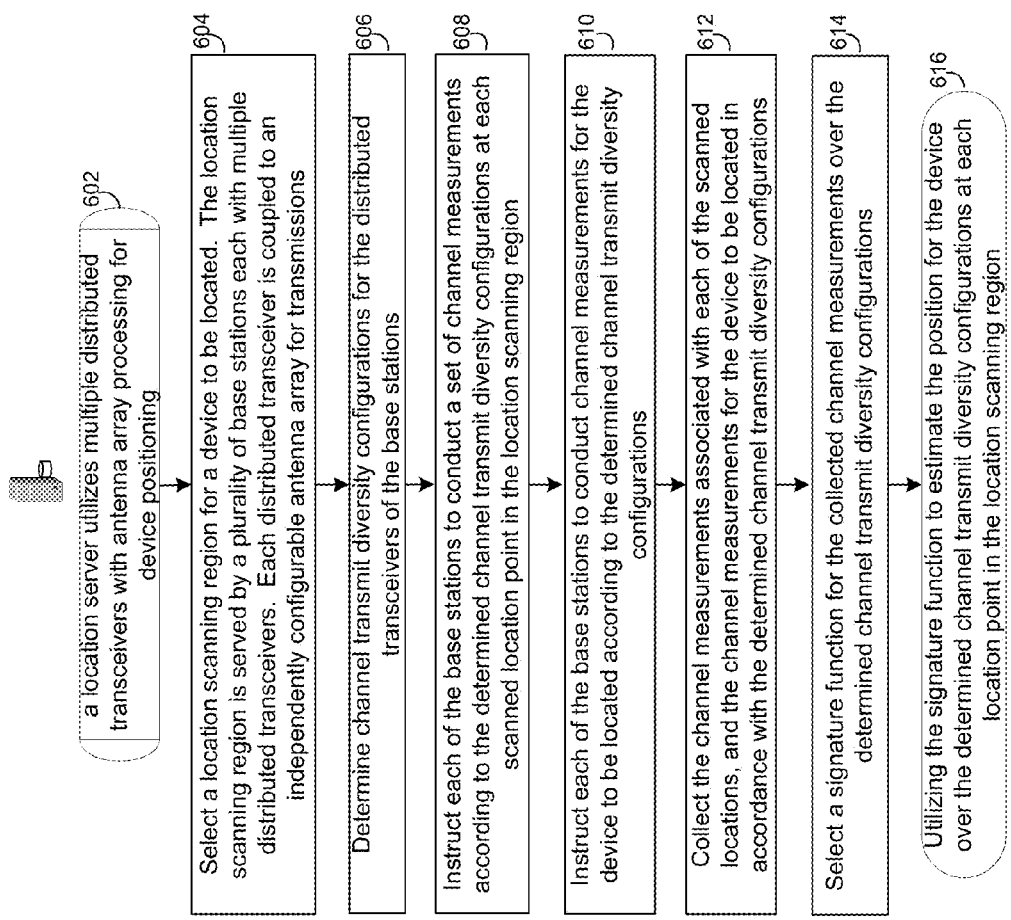
FIG. 6 is a diagram illustrating exemplary steps utilized by a location server to perform device positioning utilizing distributed transceivers with array processing, in accordance with an embodiment of the invention.

FIG. 6 is a diagram illustrating exemplary steps utilized by a location server to perform device positioning utilizing distributed transceivers with array processing, in accordance with an embodiment of the invention. Referring to FIG. 6, in step 602, a location server 500 utilizes multiple distributed transceivers with antenna array processing for device positioning. The exemplary steps start with step 604, where the database processing engine 503 may be operable to select a location scanning region $R_s$ for a device to be located, for example, the multi-radio mobile device 112. The location scanning region $R_s$ for the device to be located may be selected or identified utilizing various coarse positioning methods such as a GPS-based positioning method or a coarse angle-of-arrival based positioning. The location scanning region $R_s$ is covered or served by a plurality of base stations $BS_j$, j=1, ..., M, each with multiple distributed transceivers, i=1, ..., $N_j$. Each of the $N_j$ distributed transceivers for the base station $BS_j$ may be equipped with an independently configurable antenna array. Each of the $N_j$ distributed transceivers may operate at different carrier frequencies $f_{k,i}{}^j = f_{1,i}{}^j, \ldots, f_{K_j,i}{}^j$.

In step 606, the database processing engine 503 may be operable to determine channel transmit diversity configurations, $\{j, i, f_{k,i}{}^j, w_{s,i}{}^j\}$, for the distributed transceivers of the base stations $BS_j$, j=1, ..., M. The determined channel transmit diversity configurations $\{j, i, f_{k,i}{}^j, w_{s,i}{}^j\}$ may comprise various channel transmit settings such as, for example, radio site identifier index, transceiver index, transceiver operating frequency, and transmit antenna patterns (array coefficients) and array configurations.

In step 608, during the scanning phase, the processor 502 may instruct or signal each of the base stations $BS_j$, j=1, ..., M, to conduct a set of channel measurements $H_0\{j, i, f_{k,i}{}^j, w_{s,i}{}^j\}$ according to the determined channel transmit diversity configurations $\{j, i, f_{k,i}{}^j, w_{s,i}{}^j\}$ at each scanned location point in the location scanning region $R_s$. In step 610, during the positioning phase, the processor 502 may instruct each of the base stations to conduct channel measurements for the mobile device to be located according to the determined channel transmit diversity configurations $\{j, i, f_{k,i}{}^j, w_{s,i}{}^j\}$. In step 612, the processor 502 may be operable to retrieve the channel measurements associated with each of the scanned locations in the location scanning region $R_s$, and the channel measurements for the device to be located in accordance with the determined channel transmit diversity configurations $\{j, i, f_{k,i}{}^j, w_{s,i}{}^j\}$. In step 614, the database processing engine 503 may select a signature function SF( ) for the collected channel measurements, H{ } and the scanning phase channel measurements $H_0$\{ \}, over the determined channel transmit diversity configurations $\{j, i, f_{k,i}{}^j, w_{s,i}{}^j\}$. In this regard, the signature function $SF(H\{j, i, f_{k,i}{}^j, w_{s,i}{}^j\}, H_0\{j, i, f_{k,i}{}^j, w_{s,i}{}^j\})$ may be defined utilizing various metrics such as, for example, full channel response, RSSI, strongest multipath and/or angle of arrival (AoA), as presented in equations (2) through (5). In step 616, the signature function $SF(H\{j, i, f_{k,i}{}^j, w_{s,i}{}^j\}, H_0\{j, i, f_{k,i}{}^j, w_{s,i}{}^j\})$ may be utilized to estimate the position for the device over the determined transmit diversity configurations $\{j, i, f_{k,i}{}^j, w_{s,i}{}^j\}$ at each scanned location point in the location scanning region $R_s$.

Figure 7:
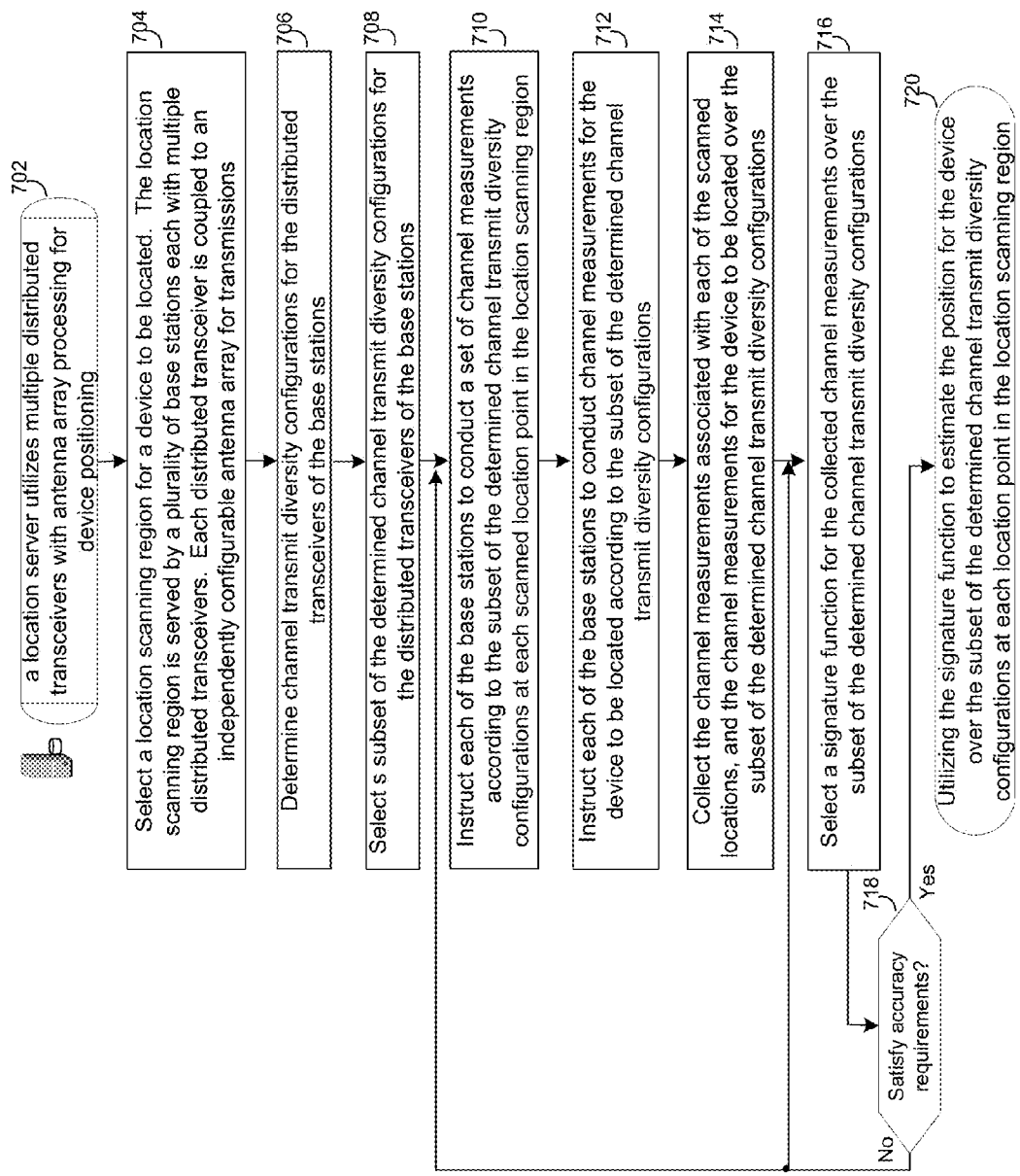
FIG. 7 is a diagram illustrating exemplary steps utilized by a location server to perform multi-level device positioning utilizing a subset of channel transmit diversity configurations, in accordance with an embodiment of the invention.

FIG. 7 is a diagram illustrating exemplary steps utilized by a location server to perform multi-level device positioning utilizing a subset of channel transmit diversity configurations, in accordance with an embodiment of the invention. Referring to FIG. 7, in step 702, a location server 500 utilizes multiple distributed transceivers with antenna array processing for device positioning. The exemplary steps start with step 704, where the database processing engine 503 may be operable to select a location scanning region $R_s$ for a device to be located, for example, the multi-radio mobile device 112. The location scanning region $R_s$ for the device to be located may be selected or identified utilizing various coarse positioning methods such as a GPS-based positioning method or coarse WLAN-based positioning method. The location scanning region $R_s$ is covered or served by a plurality of base stations $BS_j$, j=1, ..., M, each with multiple distributed transceivers, i=1, ..., $N_j$. Each of the $N_j$ distributed transceivers for the base station $BS_j$ may be equipped with an independently configurable antenna array. Each of the $N_j$ distributed transceivers may operate at different carrier frequencies $f_{k,i}{}^j = f_{1,i}{}^j, \ldots, f_{K_j,i}{}^j$.

In step 706, the database processing engine 503 may be operable to determine channel transmit diversity configurations, $\{j, i, f_{k,i}{}^j, w_{s,i}{}^j\}$, for the distributed transceivers of the base stations $BS_j$, j=1, ..., M. The determined channel transmit diversity configurations $\{j, i, f_{k,i}{}^j, w_{s,i}{}^j\}$ may comprise various channel transmit settings such as, for example, radio site identifier index, transceiver index, transceiver operating frequency, and transmit antenna patterns and array configurations. In step 708, the database processing engine 503 may select a subset of the determined channel transmit diversity configurations for the distributed transceivers of the base stations $BS_j$, j=1, ..., M. For example, a subset or portion of i=1, ..., $N_j$ transceivers and/or carrier frequencies $f_{k,i}{}^j = f_{1,i}{}^j, \ldots, f_{K_j,i}{}^j$ may be selected to be used for conducting channel measurements $H\{j, i, f_{k,i}{}^j, w_{s,i}{}^j\}$ instead of using the entire parameter indices. This sub-set selection may or may not be considered during the positioning of the mobile device (i.e., location estimation phase). During the scanning, all available transmit diversity configurations may be programmed and all corresponding channel measurements may be collected into the server database.

In step 710, the processor 502 may instruct or signal each of the base stations $BS_j$, j=1, ..., M, to conduct a set of channel measurements $H\{j, i, f_{k,i}{}^j, w_{s,i}{}^j\}$ according to the subset of the determined channel transmit diversity configurations $\{j, i, f_{k,i}{}^j, w_{s,i}{}^j\}$ at each scanned location point in the location scanning region $R_s$. Step 710 may be bypassed in order to keep the scanning phase measurements as complete as possible. In step 712, the processor 502 may instruct each of the base stations to conduct channel measurements for the mobile device to be located according to the subset of the determined channel transmit diversity configurations $\{j, i, f_{k,i}{}^j, w_{s,i}{}^j\}$. In step 714, the processor 502 may be operable to collect or retrieve the channel measurements associated with each of the scanned locations in the location scanning region $R_s$, and the channel measurements for the device to be located in accordance with the subset of the determined channel transmit diversity configurations $\{j, i, f_{k,i}{}^j, w_{s,i}{}^j\}$.

In step 716, the database processing engine 503 may select a signature function SF( ) which may vary from iteration to iteration based on: accuracy resolution from previous iteration, target resolution accuracy, and the updated region of the mobile device, for the collected channel measurements, H{ } and $H_0$\{ \}, over the subset of the determined channel transmit diversity configurations $\{j, i, f_{k,i}{}^j, w_{s,i}{}^j\}$. In this regard, the signature function $SF(H\{j, i, f_{k,i}{}^j, w_{s,i}{}^j\}, H_0\{j, i, f_{k,i}{}^j, w_{s,i}{}^j\})$ may be defined utilizing various metrics such as, for example, full channel response, RSSI, strongest multipath and/or angle of arrival (AoA), as presented in equations (2) through (5). In step 718, the database processing engine 503 may check or evaluate resolution capability of the signature function $SF(H\{j, i, f_{k,i}{}^j, w_{s,i}{}^j\}, H_0\{j, i, f_{k,i}{}^j, w_{s,i}{}^j\})$ by calculating the slop or the gradient of the signature function $SF(H\{j, i, f_{k,i}{}^j, w_{s,i}{}^j\}, H_0\{j, i, f_{k,i}{}^j, w_{s,i}{}^j\})$ versus each of the scanned locations in the location scanning region $R_s$. In instances where the resolution capability of the signature function $SF(H\{j, i, f_{k,i}{}^j, w_{s,i}{}^j\}, H_0\{j, i, f_{k,i}{}^j, w_{s,i}{}^j\})$ satisfies a particular accuracy requirement, then the exemplary steps continue in step 720, where the signature function $SF(H\{j, i, f_{k,i}{}^j, w_{s,i}{}^j\}, H_0\{j, i, f_{k,i}{}^j, w_{s,i}{}^j\})$ may be utilized to estimate the position for the device to be located over the subset of the determined channel transmit diversity configurations $\{j, i, f_{k,i}^j, w_{s,i}^j\}$ at each scanned location point in the location scanning region $R_s$.

In step 718, in instances where the resolution capability of the signature function $SF(H\{j, i, f_{k,i}^j, w_{s,i}^j\}, H_0\{j, i, f_{k,i}^j, w_{s,i}^j\})$ does not satisfy the accuracy requirements, then the exemplary steps continue in step 710 and/or in step 716 depending on system configuration. In this regard, the resolution capability of the signature function $SF(H\{j, i, f_{k,i}^j, w_{s,i}^j\}, H_0\{j, i, f_{k,i}^j, w_{s,i}^j\})$ may be improved by selecting a different signature function $SF( )$ and/or selecting a different subset of the determined channel transmit diversity configurations $\{j, i, f_{k,i}^j, w_{s,i}^j\}$ to repeat the database processing until the accuracy requirements are met.

Figure 8:
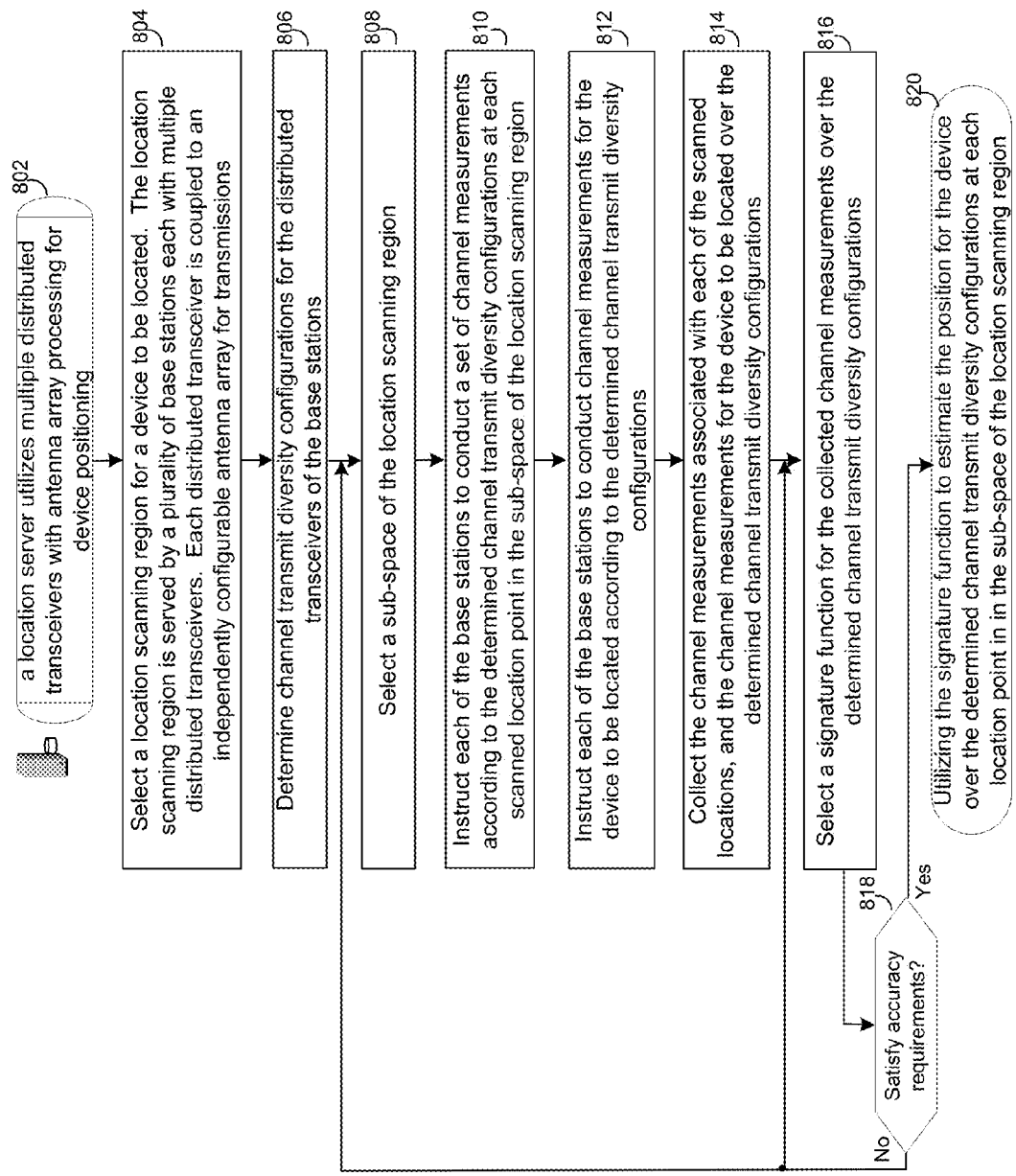
FIG. 8 is a diagram illustrating exemplary steps utilized by a location server to perform multi-level device positioning over a subset of a location scanning region, in accordance with an embodiment of the invention.

FIG. 8 is a diagram illustrating exemplary steps utilized by a location server to perform multi-level device positioning over a subset of a location scanning region, in accordance with an embodiment of the invention. Referring to FIG. 8, in step 802, a location server 500 utilizes multiple distributed transceivers with antenna array processing for device positioning. The exemplary steps start with step 804, where the database processing engine 503 may be operable to select a location scanning region $R_s$ for a device to be located, for example, the multi-radio mobile device 112. The location scanning region $R_s$ for the device to be located may be selected or identified utilizing various coarse positioning methods such as a GPS-based or WLAN-based positioning method. The location scanning region $R_s$ is covered or served by a plurality of base stations $BS_j$, j=1, . . . M, each with multiple distributed transceivers, i=1, . . . , $N_j$. Each of the $N_j$ distributed transceivers for the base station $BS_j$ may be equipped with an independently configurable antenna array. Each of the $N_j$ distributed transceivers may operate at different carrier frequencies $f_{k,i}^j = f_{1,i}^j, \ldots, f_{K_j,i}^j$.

In step 806, the database processing engine 503 may be operable to determine channel transmit diversity configurations, $\{j, i, f_{k,i}^j, w_{s,i}^j\}$, for the distributed transceivers of the base stations $BS_j$, j=1, . . . , M. The determined channel transmit diversity configurations $\{j, i, f_{k,i}^j, w_{s,i}^j\}$ may comprise various channel transmit settings such as, for example, radio site identifier index, transceiver index, transceiver operating frequency, and transmit antenna patterns and array configurations. In step 808, the database processing engine 503 may select a subspace $R'_s$ of the location scanning region $R_s$. For example, a set of particular location points away from the boundaries of the location scanning region $R_s$ may be selected to form the subspace $R'_s \subset R_s$. In one embodiment, step 808 may be bypassed as the scanning phase is conducted for the entire region of interest.

In step 810, the processor 502 may instruct or signal each of the base stations $BS_j$, j=1, . . . , M, to conduct a set of channel measurements $H_0\{j, i, f_{k,i}^j, w_{s,i}^j\}$ according to the determined channel transmit diversity configurations $\{j, i, f_{k,i}^j, w_{s,i}^j\}$ at each scanned location point in the subspace $R'_s \subset R_s$. In step 812, the processor 502 may instruct each of the base stations to conduct channel measurements for the device to be located according to the determined channel transmit diversity configurations $\{j, i, f_{k,i}^j, w_{s,i}^j\}$. In step 814, the processor 502 may be operable to collect or retrieve the channel measurements associated with each of the scanned locations in the subspace $R'_s \subset R_s$, and the channel measurements for the device to be located in accordance with the determined channel transmit diversity configurations $\{j, i, f_{k,i}^j, w_{s,i}^j\}$.

In step 816, the database processing engine 503 may select a signature function $SF( )$ for the collected channel measurements, $H\{ \}$ and $H_0\{ \}$, over the determined channel transmit diversity configurations $\{j, i, f_{k,i}^j, w_{s,i}^j\}$. In this regard, the signature function $SF(H\{j, i, f_{k,i}^j, w_{s,i}^j\}, H_0\{j, i, f_{k,i}^j, w_{s,i}^j\})$ may be defined utilizing various metrics such as, for example, full channel response, RSSI, strongest multipath and/or angle of arrival (AoA), as presented in equations (2) through (5). The choice of $SF\{ \}$ may vary from one iteration to next depending on the updated estimate of region $R''_s$ of the mobile device and target location resolution. As the region $R''_s$ gets finer and smaller over iterations, $SF\{ \}$ functions are selected that are more suitable for higher resolution but only work over a smaller region. In step 818, the database processing engine 503 may check or evaluate resolution capability of the signature function $SF(H\{j, i, f_{k,i}^j, w_{s,i}^j\}, H_0\{j, i, f_{k,i}^j, w_{s,i}^j\})$, for example, by calculating the slop or the gradient of the signature function $SF(H\{j, i, f_{k,i}^j, w_{s,i}^j\}, H_0\{j, i, f_{k,i}^j, w_{s,i}^j\})$ versus each of the scanned locations in the subspace $R'_s \subset R_s$. In instances where the resolution capability of the signature function $SF(H\{j, i, f_{k,i}^j, w_{s,i}^j\}, H_0\{j, i, f_{k,i}^j, w_{s,i}^j\})$ satisfies accuracy requirements, then the exemplary steps continue in step 820, where the signature function $SF(H\{j, i, f_{k,i}^j, w_{s,i}^j\}, H_0\{j, i, f_{k,i}^j, w_{s,i}^j\})$ may be utilized to estimate the position for the device over the determined channel transmit diversity configurations $\{j, i, f_{k,i}^j, w_{s,i}^j\}$ at each scanned location point in the subspace $R'_s \subset R_s$.

In step 818, in instances where the resolution capability of the signature function $SF(H\{j, i, f_{k,i}^j, w_{s,i}^j\}, H_0\{j, i, f_{k,i}^j, w_{s,i}^j\})$ does not satisfy the accuracy requirements, then the exemplary steps continue in step 808. In step 808, the database processing engine 503 may select a different subspace $R''_s$ (finer and smaller than the previous one using the not-sufficiently-accurate location estimate from this iteration) of the location scanning region $R_s$. For example, $R''_s \subset R'_s \subset R_s$ may be selected and the database processing may be repeated until the accuracy requirements are met.

Aspects of a method and system for device positioning utilizing distributed transceivers with array processing and database processing are provided. In accordance with various exemplary embodiments of the invention, as described with respect to FIG. 1 through FIG. 8, a mobile communication device such as the multi-radio mobile device 400 in a multipath environment 200 may be operable to multipath receive radio frequency signals from one or more radio sites such as the base stations $BS_j$, j=1, . . . , M, each with multiple distributed transceivers, i=1, . . . , $N_j$. Each of the distributed transceivers i=1, . . . , $N_j$ may be configured to operate at different carrier frequencies $f_{k,i}^j = f_{1,i}^j, \ldots, f_{K_j,i}^j$. Each of the $N_j$ distributed transceivers for the base station $BS_j$ may be equipped with an independently configurable antenna array for transmitting the radio frequency signals to the multi-radio mobile device 400, where, $w_{1,i}^j, \ldots, w_{S,i}^j$ represent the phase array coefficients of the $i^{th}$ transceiver for the base stations $BS_j$, i=1, . . . , $N_j$; j=1, . . . , M.

The host processor 414 of the multi-radio mobile device 400 may process the received signals to generate channel measurements such as, for example, channel response or RSSIs, for the received signals. A remote location server such as the location server 500 may be operable to locate the multi-radio mobile device 400 utilizing the channel measurements for the multi-radio mobile device 400. In this regard, corresponding transmit diversity configurations may be determined by the location server 500. The corresponding transmit diversity configurations may be applied to the base stations $BS_j$, j=1, . . . , M, for conducting the channel measurements for the multi-radio mobile device 400, and channel measurements at each scanned location in the location scanning region $R_s$. The position estimate for the multi-radio mobile device 400 may be calculated by the location server 500 over the location scanning region $R_s$ utilizing the channel measurements for the multi-radio mobile device 400, the channel measurements at scanned locations, and corresponding transmit diversity configurations $\{j, i, f_{k,i}^j, w_{s,i}^j\}$, which comprise base station identifier index, transceiver index, transceiver operating frequency, and transmit antenna patterns and array configurations for each of the base stations utilized for positioning the multi-radio mobile device 400.

In an exemplary embodiment of the invention, the location server 500 may select a signature function $SF(H\{j, i, f_{k,i}^j, w_{s,i}^j\}, H_0\{j, i, f_{k,i}^j, w_{s,i}^j\})$ for the channel measurements for the multi-radio mobile device 400, and the channel measurements with the scanned locations over the corresponding transmit diversity configurations $\{j, i, f_{k,i}^j, w_{s,i}^j\}$. The signature function $SF(H\{j, i, f_{k,i}^j, w_{s,i}^j\}, H_0\{j, i, f_{k,i}^j, w_{s,i}^j\})$ may be defined utilizing various metrics such as, for example, full channel response, RSSI, strongest multipath and/or angle of arrival (AoA), as presented in equations (2) through (5). The location server 500 may utilize the signature function $SF(H\{j, i, f_{k,i}^j, w_{s,i}^j\}, H_0\{j, i, f_{k,i}^j, w_{s,i}^j\})$ to calculate or determine the position estimate $(\hat{x}, \hat{y}, \hat{z})$ for the multi-radio mobile device 400 over the transmit diversity configurations $\{j, i, f_{k,i}^j, w_{s,i}^j\}$. Depending on resolution of the signature function SF( ) over the scanned locations in the location scanning region $R_s$, the location server 500 may perform multi-level positioning process for highly accurate positioning. In this regard, the database processing engine 503 may check resolution of the signature function $SF(H\{j, i, f_{k,i}^j, w_{s,i}^j\}, H_0\{j, i, f_{k,i}^j, w_{s,i}^j\})$, for example, by calculating the slope or the gradient of the signature function $SF(H\{j, i, f_{k,i}^j, w_{s,i}^j\}, H_0\{j, i, f_{k,i}^j, w_{s,i}^j\})$ versus each of the scanned locations in the location scanning region $R_s$. In instances where the resolution of the signature function $SF(H\{j, i, f_{k,i}^j, w_{s,i}^j\}, H_0\{j, i, f_{k,i}^j, w_{s,i}^j\})$ does not satisfy the accuracy requirements, then the position estimate $(\hat{x}, \hat{y}, \hat{z})$ for the multi-radio mobile device 400 may be updated. For example, the database processing engine 503 may utilize a different signature function SF( ) to calculate the updated position estimate, $(\hat{x}, \hat{y}, \hat{z})$ for the multi-radio mobile device 400 over the transmit diversity configurations $\{j, i, f_{k,i}^j, w_{s,i}^j\}$.

In addition, a subset of the channel transmit diversity configurations $\{j, i, f_{k,i}^j, w_{s,i}^j\}$ and/or a subspace of the location scanning region $R_s$ corresponding to higher resolution of the signature function $SF(H\{j, i, f_{k,i}^j, w_{s,i}^j\}, H_0\{j, i, f_{k,i}^j, w_{s,i}^j\})$ may be identified or selected by the database processing engine 503. To simplify the device positioning, the database processing engine 503 may select a subset of the transmit diversity configurations $\{j, i, f_{k,i}^j, w_{s,i}^j\}$ and/or a subspace of the location scanning region $R_s$ over which the signature function SF( ) yields a very good resolution. The database processing engine 503 may utilize the signature function SF( ) to calculate the updated position estimate $(\hat{x}, \hat{y}, \hat{z})$ for the multi-radio mobile device 400 over the selected subset of the transmit diversity configurations $\{j, i, f_{k,i}^j, w_{s,i}^j\}$ and/or the scanned locations in the selected subspace of the location scanning region $R_s$. The multi-radio mobile device 400 may receive the updated position estimate from the database processing engine 503 to support LBSs.

In one embodiment, if strong stationary reflectors are identified in the environment or strong passive/active reflectors are installed in the environment with known locations (in accordance to another embodiment), the location server 500 may choose antenna array coefficients $w_{1,i}^j, \ldots, w_{S,i}^j$ for each base station and transceiver such that the resulting antenna beam patterns would point to the strong natural/installed reflectors in the room. In the case of installed reflectors, since the location of base station and location of reflectors are known by the location server 500, the location server 500 may use that information to derive $w_{1,i}^j, \ldots, w_{S,i}^j$ coefficients that results in strong multipath through a pointed antenna pattern between the base station and those strong reflectors. Multipaths that are caused by reflectors may create virtual transmitter base stations. For example, in FIG. 2, the base station 222 transmits radio waves 231, which reflect from reflector 241 as 231a and arrive at mobile device 210. The multipath 231-231a may be viewed as originating from a virtual base station, where the position of this virtual base station is the reflection of base station 222 on the wall of reflector 241. This position intersects the straight line 231a when line 231a is extended backwards. Likewise, the reflectors 242, 243, and 244 may create virtual base stations. The greater the number of reflectors the greater is the number of virtual transmitters and that translates into a higher accuracy for the positioning method of this invention. This is in sharp contrast to conventional methods, where multipath propagation degrades system performance.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for device positioning utilizing distributed transceivers with array processing and database processing.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of processing signals, the method comprising:
in a mobile device:
receiving radio frequency signals from one or more base stations, wherein:
each of said one or more base stations comprises a plurality of distributed transceivers; and
each of said plurality of distributed transceivers comprises an independently configurable antenna array for transmitting said radio frequency signals to said mobile device;
generating channel measurements for said received radio frequency signals; and
receiving a position estimate for said mobile device from a location server, wherein:
corresponding transmit diversity configurations are determined by said location server, said corresponding transmit diversity configurations being applied to said one or more base stations for both said channel measurements for said mobile device and channel measurements at scanned locations in a location scanning region;
said position estimate for said mobile device over said location scanning region utilizing said channel measurements for said mobile device, said channel measurements at said scanned locations, and said corresponding transmit diversity configurations are calculated by said location server;
a signature function for said channel measurements for said mobile device, and said channel measurements at said scanned locations over said corresponding transmit diversity configurations, are selected by said location server;
said signature function is utilized by said location server to determine said position estimate for said mobile device over said corresponding transmit diversity configurations;
said position estimate for said mobile device is updated by said location server based on a resolution of said signature function over said scanned locations in said location scanning region;
at least one of (i) a subset of said corresponding transmit diversity configurations and (ii) a subspace of said location scanning region is selected by said location server based on said resolution of said signature function over said scanned locations in said location scanning region; and
said signature function is utilized by said location server to calculate said updated position estimate for said mobile device over at least one of (i) said subset of said corresponding transmit diversity configurations and (ii) said subspace of said location scanning region.

2. The method according to claim 1, wherein said signature function is defined in terms of a full channel response, a received signal strength indicator, a strongest multipath, or an angle of arrival for said channel measurements for said mobile device, and said channel measurements at said scanned locations over said corresponding transmit diversity configurations.

3. The method according to claim 1, wherein said updated position estimate for said mobile device is calculated by said location server, by utilizing a different signature function for said channel measurements for said mobile device and said channel measurements with said scanned locations over said corresponding transmit diversity configurations.

4. The method according to claim 1, comprising receiving said updated position estimate at said mobile device.

5. A system for processing signals, the system comprising:
a mobile device, said mobile device being operable to:
receive radio frequency signals from one or more base stations, wherein:
each of said one or more base stations comprises a plurality of distributed transceivers; and
each of said plurality of distributed transceivers comprises an independently configurable antenna array for transmitting said radio frequency signals to said mobile device;
determine channel characteristics for said received radio frequency signals;
generate channel measurements for said received radio frequency signals; and
receive a position estimate for said mobile device from a location server, wherein:
corresponding transmit diversity configurations are determined by said location server, said corresponding transmit diversity configurations being applied to said one or more base stations for both said channel measurements for said mobile device and channel measurements at scanned locations in a location scanning region;
said position estimate for said mobile device over said location scanning region utilizing said channel measurements for said mobile device, said channel measurements at said scanned locations, and said corresponding transmit diversity configurations are calculated by said location server;
a signature function for said channel measurements for said mobile device, and said channel measurements at said scanned locations over said corresponding transmit diversity configurations, are selected by said location server;
said signature function is utilized by said location server to determine said position estimate for said mobile device over said corresponding transmit diversity configurations;
said position estimate for said mobile device is updated by said location server based on a resolution of said signature function over said scanned locations in said location scanning region;
at least one of (i) a subset of said corresponding transmit diversity configurations and (ii) a subspace of said location scanning region is selected by said location server based on said resolution of said signature function over said scanned locations in said location scanning region; and
said signature function is utilized by said location server to calculate said updated position estimate for said mobile device over at least one of (i) said subset of said corresponding transmit diversity configurations and (ii) said subspace of said location scanning region.

6. The system according to claim 5, wherein said signature function is defined in terms of a full channel response, a received signal strength indicator, a strongest multipath, or an angle of arrival for said channel measurements for said mobile device, and said channel measurements at said scanned locations over said corresponding transmit diversity configurations.

7. The method according to claim 5, wherein said updated position estimate for said mobile device is calculated by said location server, by utilizing a different signature function for said channel measurements for said mobile device and said channel measurements with said scanned locations over said corresponding transmit diversity configurations.

8. The system according to claim 5, wherein said mobile device receives said updated position estimate.

9. A method for processing signals, the method comprising:
in a mobile device:
receiving radio frequency signals from one or more base stations in a location scanning region, wherein:
each of said one or more base stations comprises a plurality of distributed transceivers; and
each of said plurality of distributed transceivers comprises an independently configurable antenna array for transmitting said radio frequency signals to said mobile device;
communicating channel measurements generated by said mobile device for said received radio frequency signals to a location server, wherein said location server:
configures, utilizing one or more channel transmit settings, said independently configurable antenna array for said plurality of distributed transceivers in said one or more base stations in said location scanning region to transmit said radio frequency signals;
determines a coarse position estimate for said mobile device for each of a plurality of sub-regions within said location scanning region;
applies a plurality of different signature functions to said determined coarse position estimate for said each of said plurality of sub-regions to generate corresponding sub-regions position estimates; and
determines a position estimate for said mobile device based on said sub-regions position estimates; and
receiving said position estimate for said mobile device from said location server.

10. The method according to claim 9, wherein said location server customizes said each of said plurality of different signature functions for said each of said plurality of sub-regions.

11. The method according to claim 10, wherein said each of said plurality of different signature functions is customized for said each of said plurality of sub-regions based on said one or more channel transmit settings.

12. The method according to claim 9, wherein said location server generates corresponding location estimation resolution and error for each of said generated corresponding sub-regions position estimates.

13. The method according to claim 12, wherein said location server sorts said generated corresponding sub-regions position estimates based on said generated corresponding location estimation resolution and error.

14. The method according to claim 13, wherein said location server discards one or more of said generated corresponding sub-regions position estimates that do not improve said generated corresponding location estimation resolution and error above a threshold.

15. The method according to claim 14, wherein said location server utilizes said one or more of said generated corresponding sub-regions position estimates, which improves said generated corresponding location estimation resolution and error above said threshold, for said determination of said position estimate for said mobile device.

16. The method according to claim 14, wherein said threshold is programmable.

17. The method according to claim 13, wherein said location server filters one or more variables that do not improve said generated corresponding location estimation resolution and error above a threshold.

18. The method according to claim 17, wherein said one or more variables comprises antenna phase array coefficients for said independently configurable antenna array in each of said plurality of distributed transceivers, carrier frequencies utilized by said one or more base stations in said location scanning region, a number of said one or more base stations in said location scanning region that are utilized, and a number of said plurality of distributed transceivers that are utilized.

19. A system for processing signals, the system comprising:
a mobile device, said mobile device is operable to:
receive radio frequency signals from one or more base stations in a location scanning region, wherein:
each of said one or more base stations comprises a plurality of distributed transceivers; and
each of said plurality of distributed transceivers comprises an independently configurable antenna array for transmitting said radio frequency signals to said mobile device;
communicate channel measurements generated by said mobile device for said received radio frequency signals to a location server, wherein said location server:
configures, utilizing one or more channel transmit settings, said independently configurable antenna array for said plurality of distributed transceivers in said one or more base stations in said location scanning region to transmit said radio frequency signals;
determines a coarse position estimate for said mobile device for each of a plurality of sub-regions within said location scanning region;
applies a plurality of different signature functions to said determined coarse position estimate for said each of said plurality of sub-regions to generate corresponding sub-regions position estimates; and
determines a position estimate for said mobile device based on said sub-regions position estimates; and
receive said position estimate for said mobile device from said location server.

20. The system according to claim 19, wherein said location server customizes said each of said plurality of different signature functions for said each of said plurality of sub-regions.

21. The system according to claim 20, wherein said each of said plurality of different signature functions is customized for said each of said plurality of sub-regions based on said one or more channel transmit settings.

22. The system according to claim 19, wherein said location server generates corresponding location estimation resolution and error for each of said generated corresponding sub-regions position estimates.

23. The system according to claim 22, wherein said location server sorts said generated corresponding sub-regions position estimates based on said generated corresponding location estimation resolution and error.

24. The system according to claim 23, wherein said location server discards one or more of said generated corresponding sub-regions position estimates that do not improve said generated corresponding location estimation resolution and error above a threshold.

25. The system according to claim 24, wherein said location server utilizes said one or more of said generated corresponding sub-regions position estimates, which improves said generated corresponding location estimation resolution and error above said threshold, for said determination of said position estimate for said mobile device.

26. The system according to claim 24, wherein said threshold is programmable.

27. The system according to claim 23, wherein said location server filters one or more variables that do not improve said generated corresponding location estimation resolution and error above a threshold.

28. The system according to claim 27, wherein said one or more variables comprises antenna phase array coefficients for said independently configurable antenna array in each of said plurality of distributed transceivers, carrier frequencies utilized by said one or more base stations in said location scanning region, a number of said one or more base stations in said location scanning region that are utilized, and a number of said plurality of distributed transceivers that are utilized.

29. The method according to claim 1, wherein the functionality of said location server is implemented in one or more of said base stations.

30. The method according to claim 1, wherein the functionality of said location server is implemented in said mobile device.

31. The method according to claim 1, wherein the functionality of said location server is implemented in a remote location server external to said mobile device and said one or more base stations.

32. The system according to claim 5, wherein the functionality of said location server is implemented in one or more of said base stations.

33. The system according to claim 5, wherein the functionality of said location server is implemented in said mobile device.

34. The system according to claim 5, wherein the functionality of said location server is implemented in a remote location server external to said mobile device and said one or more base stations.

35. The method according to claim 9, wherein the functionality of said location server is implemented in one or more of said base stations.

36. The method according to claim 9, wherein the functionality of said location server is implemented in said mobile device.

37. The method according to claim 9, wherein the functionality of said location server is implemented in a remote location server external to said mobile device and said one or more base stations.

38. The system according to claim 19, wherein the functionality of said location server is implemented in one or more of said base stations.

39. The system according to claim 19, wherein the functionality of said location server is implemented in said mobile device.

40. The system according to claim 19, wherein the functionality of said location server is implemented in a remote location server external to said mobile device and said one or more base stations.

* * * * *